(12) United States Patent
Miller

(10) Patent No.: US 12,655,832 B2
(45) Date of Patent: Jun. 16, 2026

(54) SHAPE MEMORY ALLOY BISTABLE ACTUATOR

(71) Applicant: Hutchinson Technology Incorporated, Hutchinson, MN (US)

(72) Inventor: Mark A. Miller, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 18/989,771

(22) Filed: Dec. 20, 2024

(65) Prior Publication Data

US 2025/0215863 A1 Jul. 3, 2025

Related U.S. Application Data

(60) Provisional application No. 63/615,166, filed on Dec. 27, 2023, provisional application No. 63/615,163, filed on Dec. 27, 2023.

(51) Int. Cl.
F03G 7/06 (2006.01)

(52) U.S. Cl.
CPC ....... F03G 7/06143 (2021.08); F03G 7/0614 (2021.08)

(58) Field of Classification Search
CPC ....................................................... F03G 7/06
See application file for complete search history.

(56) References Cited

U.S. PATENT DOCUMENTS

| | | | |
|---|---|---|---|
| 535,880 A | 3/1895 | Anderson | |
| 3,893,055 A | 7/1975 | Jost et al. | |
| 5,325,880 A * | 7/1994 | Johnson | F16K 99/0038 |
| | | | 60/528 |
| 5,990,777 A | 11/1999 | Whiteman, Jr. | |
| 6,982,515 B2 | 1/2006 | Howell et al. | |
| 8,584,456 B1 | 11/2013 | McKnight | |
| 2008/0307786 A1 | 12/2008 | Hafez et al. | |
| 2022/0397103 A1 * | 12/2022 | Jelkin | G02B 7/09 |

OTHER PUBLICATIONS

Qui, J. et al., "A Curved-Beam Bistable Mechanism", Journal of Microelectromechanical Systems, vol. 13, No. 2, pp. 137-146, Apr. 2004.
International Search Report and Written Opinion in International Application No. PCT/US2024/061774, mailed Apr. 30, 2025.

* cited by examiner

*Primary Examiner* — Shafiq Mian

(74) *Attorney, Agent, or Firm* — DLA Piper LLP (US)

(57) ABSTRACT

The present embodiments relate to a bistable SMA actuator. The bistable SMA actuator as described herein can include a two-position actuator to move a bistable structure between two positions. Multiple SMA actuators can be disposed opposite one another to move the bistable structure between the two positions. For example, a first SMA actuator can actuate to move the bistable structure from a first position to a second position. After actuation by the first SMA actuator, the actuator can de-actuate, and the bistable structure can use spring force to hold the bistable structure in the second position. The bistable structure can include multiple springs that use force(s) from the springs to hold the bistable structure at a position with zero external force provided by the SMA actuators.

18 Claims, 27 Drawing Sheets

MOVING CARRIAGE 114

BRACE 116

SPRING FLEXURE 108B

BASE 112

100C

102B

108A

SMA BIMORPH ACTUATOR 102A

400C

MOVING CARRIAGE 412

BUCKLER ARM 426

SMA WIRE 414

SLIDE BASE 416

SLIDE BEARING 418

BRACE 420

SPRING FLEXURE 422

BASE 410

SMA BUCKLER ACTUATOR 402A

CHAMBER (INSIDE) 808

DIAPHRAGM 810

802B

806

802A

800A

SHAPE MEMORY ALLOY BISTABLE ACTUATOR

CROSS-REFERENCE TO RELATED APPLICATIONS

This application claims the benefit of, and priority to, U.S. Provisional Application No. 63/615,163 filed on Dec. 27, 2023, and U.S. Provisional Application No. 63/615,166 filed on Dec. 27, 2023, which are hereby incorporated by reference in their entirety.

FIELD

The invention relates generally to a bistable shape memory alloy actuator.

BACKGROUND

An actuator can be used to actuate a moving member between multiple positions. For example, a switch can include an actuator to move a moving member between an 'on' and 'off' position to provide electricity to a circuit.

In many instances, a shape memory alloy (SMA) element can be implemented as part of an actuator. For example, an actuator can include a static member and a moving member, with a SMA element connecting the static member and moving member. Further, a current can be applied to a SMA element to cause the SMA element to actuate to an actuated position, thereby moving the moving member relative to an axis.

SUMMARY

The present embodiments relate to a bistable SMA actuator. The bistable SMA actuator as described herein can include a two-position actuator to move a bistable structure between two positions. Multiple SMA actuators can be disposed opposite one another to move the bistable structure between the two positions. For example, a first SMA actuator can actuate to move the bistable structure from a first position to a second position. After actuation by the first SMA actuator, the actuator can de-actuate, and the bistable structure can use spring force to hold the bistable structure in the second position. The bistable structure can include multiple springs that use force(s) from the springs to hold the bistable structure at a position with zero external force provided by the SMA actuators.

In a first example embodiment, a bistable actuator is provided. The bistable actuator can include a first actuator (e.g., 102A) and a second actuator (e.g., 102B). The first actuator can include a first shape memory alloy (SMA) element, and the second actuator can include a second SMA element. In some instances, the first actuator is disposed opposite to the second actuator.

In some instances, any of the first actuator and the second actuator further includes: an actuator base and a beam. A first end of the beam can be fixed to the actuator base. Further, a second end of the beam can be unfixed from the actuator base and is connected to the moving carriage. Each SMA element can be connected to the first end and the second end of the beam.

In some instances, any of the first actuator and the second actuator further includes an actuator circuit and a first load point and a second load point disposed on opposing ends of the actuator circuit. Each SMA element can be connected to the first load point and the second load point, with a central portion of each SMA element being disposed around a protrusion extending from the moving carriage.

In some instances, any of the first actuator and the second actuator further includes a slide base and a first load point and a second load point disposed on opposing ends of the slide base. Each SMA element can be connected to the first load point and the second load point. Any of the first actuator and the second actuator further includes a first actuator arm extending from the first load point and a second actuator arm extending from the second load point. Each of the first actuator arm and the second actuator arm can be connected to the moving carriage.

The bistable actuator can also include a bistable structure (e.g., 106) connected to each of the first actuator and the second actuator. The bistable structure can be configured to move between a first position and a second position responsive to actuation the first actuator or the second actuator.

The bistable structure can include a moving carriage connecting the bistable structure to each of the first actuator and the second actuator, a brace, and at least two springs connected to the brace. Each of the at least two springs can provide a force that is configured to hold the bistable structure in either the first position or the second position.

In some instances, the first actuator is configured to supply an electrical current to the first SMA element, causing the first SMA element to contract and to move the moving carriage into the first position. The second actuator can be configured to supply the electrical current to the second SMA element, causing the second SMA element to contract and to move the moving carriage into the second position.

In some instances, the bistable actuator further includes at least a first and a second electrical contact connected to the moving carriage. The first position of the bistable structure electrically isolates the first electrical contact from the second electrical contact. The second position of the bistable structure electrically connects the first electrical contact to the second electrical contact.

In some instances, the bistable actuator further includes a directional control valve connected to the moving carriage. The first position of the bistable structure moves a seal of the directional control valve to allow for a fluid or gas to flow into a first channel. The second position of the bistable structure moves the directional control valve to allow for the fluid or gas to flow into a second channel.

In some instances, the bistable actuator further includes at least a first diaphragm and a second diaphragm connected to the moving carriage. Each of the first diaphragm and the second diaphragm configured to pull a fluid or gas from a first chamber and push the fluid or gas into a second chamber, with the first position of the bistable structure pushes each diaphragm to direct the fluid or gas in a first flow direction. The second position of the bistable structure pushes each diaphragm to direct the fluid or gas in a second flow direction.

Another example embodiment provides a method. The method can include providing, to a first SMA element of a first actuator, a current to cause the first SMA element to contract, moving a bistable structure connected to the first actuator into a first position. A force provided by a first spring of the bistable structure can hold the bistable structure in the first position. The method can also include providing, to a second SMA element of a second actuator, the current to cause the second SMA element to contract, moving the bistable structure into a second position. A force provided by a second spring of the bistable structure can hold the bistable structure in the second position.

In some instances, the first actuator is disposed opposite to the second actuator.

In some instances, the first position of the bistable structure electrically isolates a first electrical contact from a second electrical contact connected to the bistable structure. Further, the second position of the bistable structure electrically connects the first electrical contact to the second electrical contact.

In some instances, the first position of the bistable structure moves a seal of a directional control valve connected to the bistable structure to allow for a fluid or gas to flow into a first channel. The second position of the bistable structure moves the directional control valve to allow for the fluid or gas to flow into a second channel.

In some instances, each of a first diaphragm and a second diaphragm are connected to the bistable structure and configured to pull a fluid or gas from a first chamber and push the fluid or gas into a second chamber, with the first position of the bistable structure pushes each diaphragm to direct the fluid or gas in a first flow direction. The second position of the bistable structure pushes each diaphragm to direct the fluid or gas in a second flow direction.

Another example embodiment provides a device. The device can include a first actuator and a second actuator. The first actuator can include a first shape memory alloy (SMA) element and the second actuator can include a second SMA element.

Any of the first actuator and the second actuator can further include an actuator base; and a beam. A first end of the beam can be fixed to the actuator base and a second end of the beam is unfixed from the actuator base. Each SMA element can be connected to the first end and the second end of the beam.

The device can also include a bistable structure connected to each of the first actuator and the second actuator at the second end of the beam of each of the first actuator and the second actuator. The bistable structure can be configured to move between a first position and a second position responsive to actuation of the first actuator or the second actuator. Each of at least two springs can provide a force that is configured to hold the bistable structure in either the first position or the second position.

In some instances, the first actuator is disposed opposite to the second actuator.

In some instances, the first actuator is configured to supply an electrical current to the first SMA element, causing the first SMA element to contract and to move the bistable structure into the first position. The second actuator can be configured to supply the electrical current to the second SMA element, causing the second SMA element to contract and to move the bistable structure into the second position.

In some instances, the device also includes at least a first and a second electrical contact connected to the bistable structure. The first position of the bistable structure electrically isolates the first electrical contact from the second electrical contact. The second position of the bistable structure electrically connects the first electrical contact to the second electrical contact.

In some instances, the device also includes a directional control valve connected to the bistable structure. The first position of the bistable structure moves a seal of the directional control valve to allow for a fluid or gas to flow into a first channel. The second position of the bistable structure moves the directional control valve to allow for the fluid or gas to flow into a second channel.

In some instances, the device also includes at least a first diaphragm and a second diaphragm connected to the bistable structure. Each of the first diaphragm and the second diaphragm can be configured to pull a fluid or gas from a first chamber and push the fluid or gas into a second chamber, with the first position of the bistable structure pushes each diaphragm to direct the fluid or gas in a first flow direction, and wherein the second position of the bistable structure pushes each diaphragm to direct the fluid or gas in a second flow direction.

Other features and advantages of embodiments of the present invention will be apparent from the accompanying drawings and from the detailed description that follows.

BRIEF DESCRIPTION OF THE DRAWINGS

Embodiments of the present invention are illustrated, by way of example and not limitation, in the figures of the accompanying drawings, in which like references indicate similar elements and in which.

DETAILED DESCRIPTION

Figure 1A:
FIGS. 1A-1D illustrate various views of a SMA bistable actuator switch according to some embodiments, which may also be characterized as a SMA micro valve actuator.
Figure 1A:
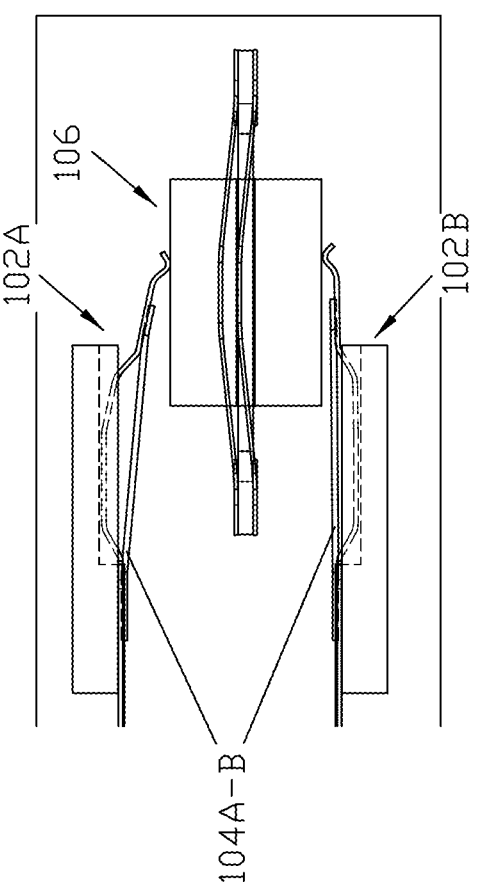

A shape memory alloy (SMA) element can be implemented as part of an actuator. For example, an actuator can include a static member and a moving member, with a SMA element connecting the static member and moving member. Further, a current can be applied to a SMA element to cause the SMA element to actuate to an actuated position, thereby moving the moving member relative to an axis. As an example, an SMA actuator can be used as part of an optical image stabilization system or an auto-focus system.

As another example embodiment, an SMA element can be used as part of a valve. In this example, a moving member can move between an open position and a closed position. The SMA element can actuate to move the moving member between the open position and the closed position. However, in many designs, the moving member may require force to be held in either the open or closed position.

The present embodiments relate to a bistable SMA actuator. The bistable SMA actuator as described herein can include a two-position actuator to move a bistable structure between two positions. Multiple SMA actuators can be disposed opposite one another to move the bistable structure between the two positions. For example, a first SMA actuator can actuate to move the bistable structure from a first position to a second position. After actuation by the first SMA actuator, the actuator can de-actuate, and the bistable structure can use spring force to hold the bistable structure in the second position. The bistable structure can include multiple springs that use force(s) from the springs to hold the bistable structure at a position with zero external force provided by the SMA actuators.

The bistable SMA actuator as described herein can be applicable to one or more contexts. For example, the bistable SMA actuator can be used as a micro valve actuator, a single pole or double pole electrical switching relay, a pneumatic or hydraulic control valve actuator, a fluid pump actuator, etc.

In a first example embodiment, a bistable actuator is provided. The bistable actuator can include a first actuator (e.g., 102A) and a second actuator (e.g., 102B). The first actuator can include a first shape memory alloy (SMA) element, and the second actuator can include a second SMA element. In some instances, the first actuator is disposed opposite to the second actuator.

In some instances, any of the first actuator and the second actuator further includes: an actuator base and a beam. A first end of the beam can be fixed to the actuator base. Further, a second end of the beam can be unfixed from the actuator base and is connected to the moving carriage. Each SMA element can be connected to the first end and the second end of the beam.

In some instances, any of the first actuator and the second actuator further includes an actuator circuit and a first load point and a second load point disposed on opposing ends of the actuator circuit. Each SMA element can be connected to the first load point and the second load point, with a central portion of each SMA element being disposed around a protrusion extending from the moving carriage.

In some instances, any of the first actuator and the second actuator further includes a slide base and a first load point and a second load point disposed on opposing ends of the slide base. Each SMA element can be connected to the first load point and the second load point. Any of the first actuator and the second actuator further includes a first actuator arm extending from the first load point and a second actuator arm extending from the second load point. Each of the first actuator arm and the second actuator arm can be connected to the moving carriage.

The bistable actuator can also include a bistable structure (e.g., 106) connected to each of the first actuator and the second actuator. The bistable structure can be configured to move between a first position and a second position responsive to actuation the first actuator or the second actuator.

The bistable structure can include a moving carriage connecting the bistable structure to each of the first actuator and the second actuator, a brace, and at least two springs connected to the brace. Each of the at least two springs can provide a force that is configured to hold the bistable structure in either the first position or the second position.

In some instances, the first actuator is configured to supply an electrical current to the first SMA element, causing the first SMA element to contract and to move the moving carriage into the first position. The second actuator can be configured to supply the electrical current to the second SMA element, causing the second SMA element to contract and to move the moving carriage into the second position.

In some instances, the bistable actuator further includes at least a first and a second electrical contact connected to the moving carriage. The first position of the bistable structure electrically isolates the first electrical contact from the second electrical contact. The second position of the bistable structure electrically connects the first electrical contact to the second electrical contact.

In some instances, the bistable actuator further includes a directional control valve connected to the moving carriage. The first position of the bistable structure moves a seal of the directional control valve to allow for a fluid or gas to flow into a first channel. The second position of the bistable structure moves the directional control valve to allow for the fluid or gas to flow into a second channel.

In some instances, the bistable actuator further includes at least a first diaphragm and a second diaphragm connected to the moving carriage. Each of the first diaphragm and the second diaphragm configured to pull a fluid or gas from a first chamber and push the fluid or gas into a second chamber, with the first position of the bistable structure pushes each diaphragm to direct the fluid or gas in a first flow direction. The second position of the bistable structure pushes each diaphragm to direct the fluid or gas in a second flow direction.

Another example embodiment provides a method. The method can include providing, to a first SMA element of a first actuator, a current to cause the first SMA element to contract, moving a bistable structure connected to the first actuator into a first position. A force provided by a first spring of the bistable structure can hold the bistable structure in the first position. The method can also include providing, to a second SMA element of a second actuator, the current to cause the second SMA element to contract, moving the bistable structure into a second position. A force provided by a second spring of the bistable structure can hold the bistable structure in the second position.

In some instances, the first actuator is disposed opposite to the second actuator.

In some instances, the first position of the bistable structure electrically isolates a first electrical contact from a second electrical contact connected to the bistable structure. Further, the second position of the bistable structure electrically connects the first electrical contact to the second electrical contact.

In some instances, the first position of the bistable structure moves a seal of a directional control valve connected to the bistable structure to allow for a fluid or gas to flow into a first channel. The second position of the bistable structure moves the directional control valve to allow for the fluid or gas to flow into a second channel.

In some instances, each of a first diaphragm and a second diaphragm are connected to the bistable structure and configured to pull a fluid or gas from a first chamber and push the fluid or gas into a second chamber, with the first position of the bistable structure pushes each diaphragm to direct the fluid or gas in a first flow direction. The second position of the bistable structure pushes each diaphragm to direct the fluid or gas in a second flow direction.

Another example embodiment provides a device. The device can include a first actuator and a second actuator. The first actuator can include a first shape memory alloy (SMA) element and the second actuator can include a second SMA element.

Any of the first actuator and the second actuator can further include an actuator base; and a beam. A first end of the beam can be fixed to the actuator base and a second end of the beam is unfixed from the actuator base. Each SMA element can be connected to the first end and the second end of the beam.

The device can also include a bistable structure connected to each of the first actuator and the second actuator at the second end of the beam of each of the first actuator and the second actuator. The bistable structure can be configured to move between a first position and a second position responsive to actuation of the first actuator or the second actuator. Each of at least two springs can provide a force that is configured to hold the bistable structure in either the first position or the second position.

In some instances, the first actuator is disposed opposite to the second actuator.

In some instances, the first actuator is configured to supply an electrical current to the first SMA element, causing the first SMA element to contract and to move the bistable structure into the first position. The second actuator can be configured to supply the electrical current to the second SMA element, causing the second SMA element to contract and to move the bistable structure into the second position.

In some instances, the device also includes at least a first and a second electrical contact connected to the bistable structure. The first position of the bistable structure electrically isolates the first electrical contact from the second electrical contact. The second position of the bistable structure electrically connects the first electrical contact to the second electrical contact.

In some instances, the device also includes a directional control valve connected to the bistable structure. The first position of the bistable structure moves a seal of the directional control valve to allow for a fluid or gas to flow into a first channel. The second position of the bistable structure moves the directional control valve to allow for the fluid or gas to flow into a second channel.

In some instances, the device also includes at least a first diaphragm and a second diaphragm connected to the bistable structure. Each of the first diaphragm and the second diaphragm can be configured to pull a fluid or gas from a first chamber and push the fluid or gas into a second chamber, with the first position of the bistable structure pushes each diaphragm to direct the fluid or gas in a first flow direction, and wherein the second position of the bistable structure pushes each diaphragm to direct the fluid or gas in a second flow direction.

SMA Bistable Actuator Switch

A first example embodiment relates to a SMA bistable actuator switch. FIGS. 1A-1D illustrate various views of a SMA bistable actuator switch. For instance, FIG. 1A illustrates a side view of a SMA bistable actuator switch. As shown in FIG. 1A, the switch 100A can include SMA actuators 102A-B and a bistable structure 106 (note that in this exemplary embodiment, the SMA actuators are sometimes referred to as a bimorph actuator(s)). A bimorph actuator can include an actuator with a beam, with a first end fixed to a base and a second end unfixed. The SMA element can be connected to the first end and the second end of the beam. When providing a current to the SMA element, the SMA element can actuate, causing the unfixed end to move to an actuated position.

Each SMA actuator 102A-B can be disposed opposite one another. Further, each actuator 102A-B can include a corresponding SMA element 104A-B. In the embodiment as shown in FIG. 1A, a first SMA actuator 102A can have an actuated SMA element 104A to move the bistable structure 106 from a first position to a second position.

The bistable structure 106 can include a moving carriage, a brace, and multiple springs. The elements of the bistable structure 106 are described in greater detail with respect to FIGS. 1C-1D.

Figure 1B:
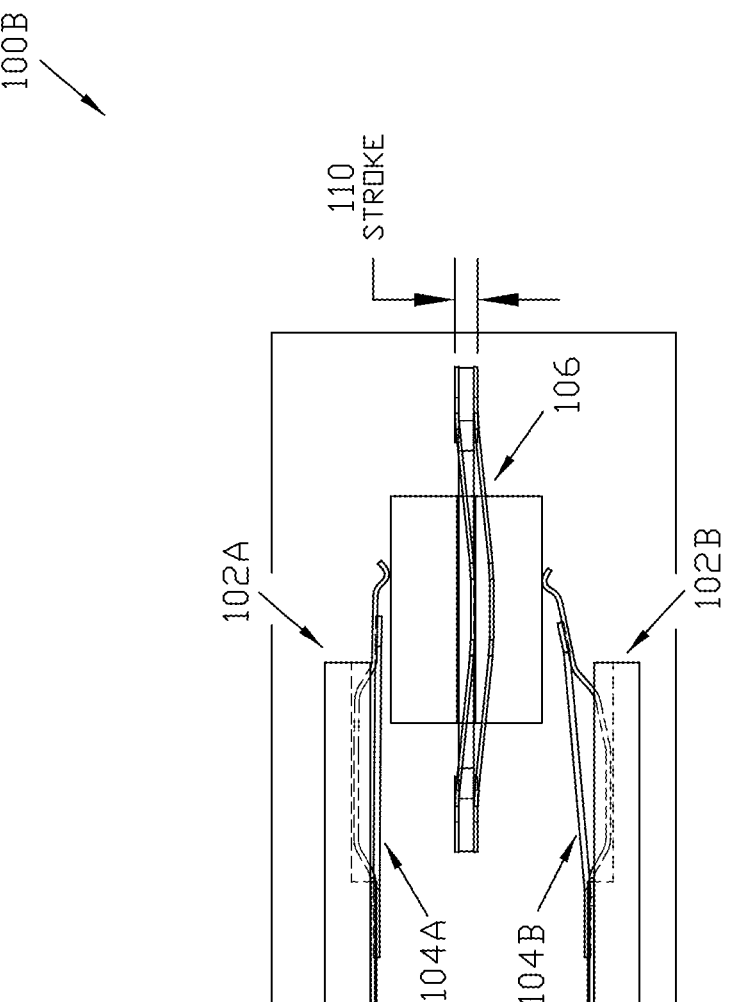

FIG. 1B side view of a SMA actuator switch 100B (which may be a bimorph type actuator switch) in a second position.

As shown in FIG. 1B, the SMA actuator 102B can actuate, causing the bistable structure to move from the second position back to a first position. The movement range of the bistable structure 106 can be shown by stroke 110.

Figure 1C:
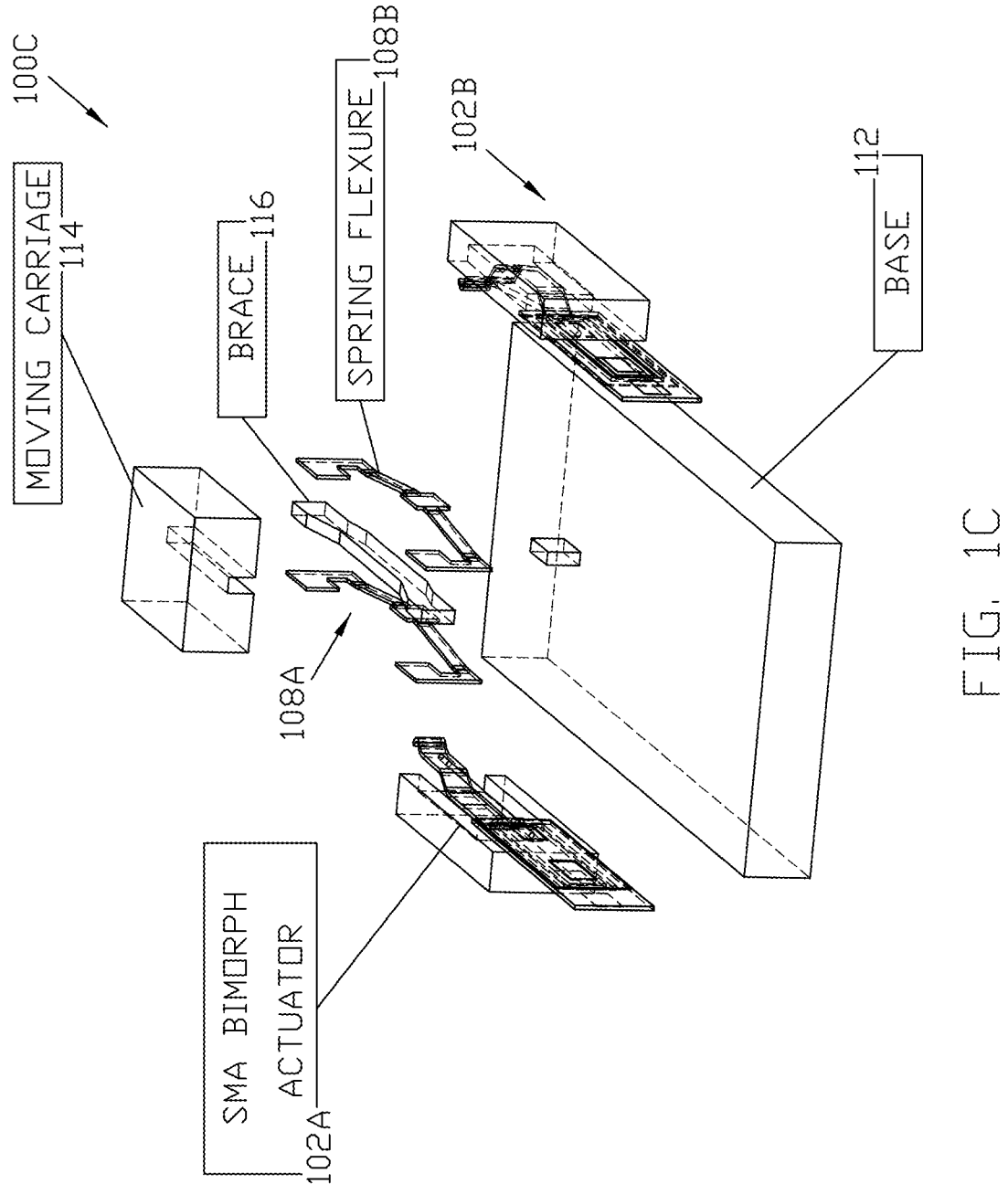
Figure 1D:
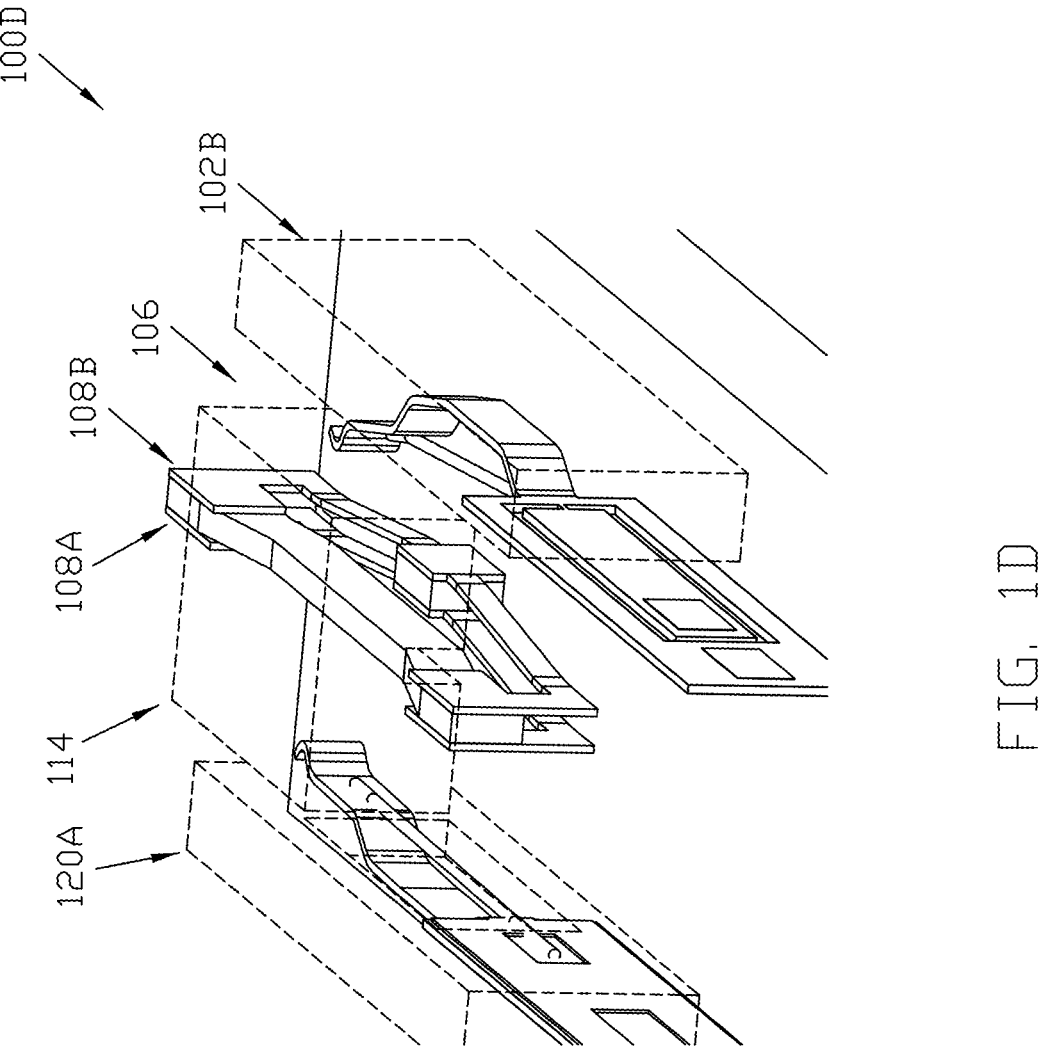

FIG. 1C illustrates an exploded view of the SMA bimorph actuator switch 100C. As shown in FIG. 1C, the switch 100C can include SMA actuators 102A-B, a base 112, and a bistable structure including a moving carriage 114, brace 116, and springs 108A-B. The springs that are part of the bistable structure can hold the bistable structure in a position without any external force. In some embodiments the brace configures the two springs a certain distance apart from each other, and can act as a spacer. The brace and how the two springs are attached to it, gives the springs their holding force in the two bistable positions. In some instances, the moving carriage can be fixed to the bistable structure, such as adhered to the structure using an adhesive. In some instances, the moving carriage and the brace can be made of a single component. FIG. 1D illustrates a top view of the SMA bimorph actuator switch 100D. As shown in FIG. 1D, the bistable structure 106 can include a brace connecting the springs, with the moving carriage connected to the brace. The spring load can leave the bistable structure in a current position. Further, the bistable structure can include two stable positions, and can be fixed to a base at its center. The bistable structure could also be built with ends fixed to the base and the center moving back and forth and attached to the moving carriage.

Angled SMA Bistable Actuator Switch

In another example embodiment, an angled SMA bistable actuator switch can incorporate two SMA actuators with an SMA element connected to the moving carriage at a center of the SMA element. FIGS. 2A-2D illustrate views of an angled SMA bistable actuator switch.

Figure 2A:
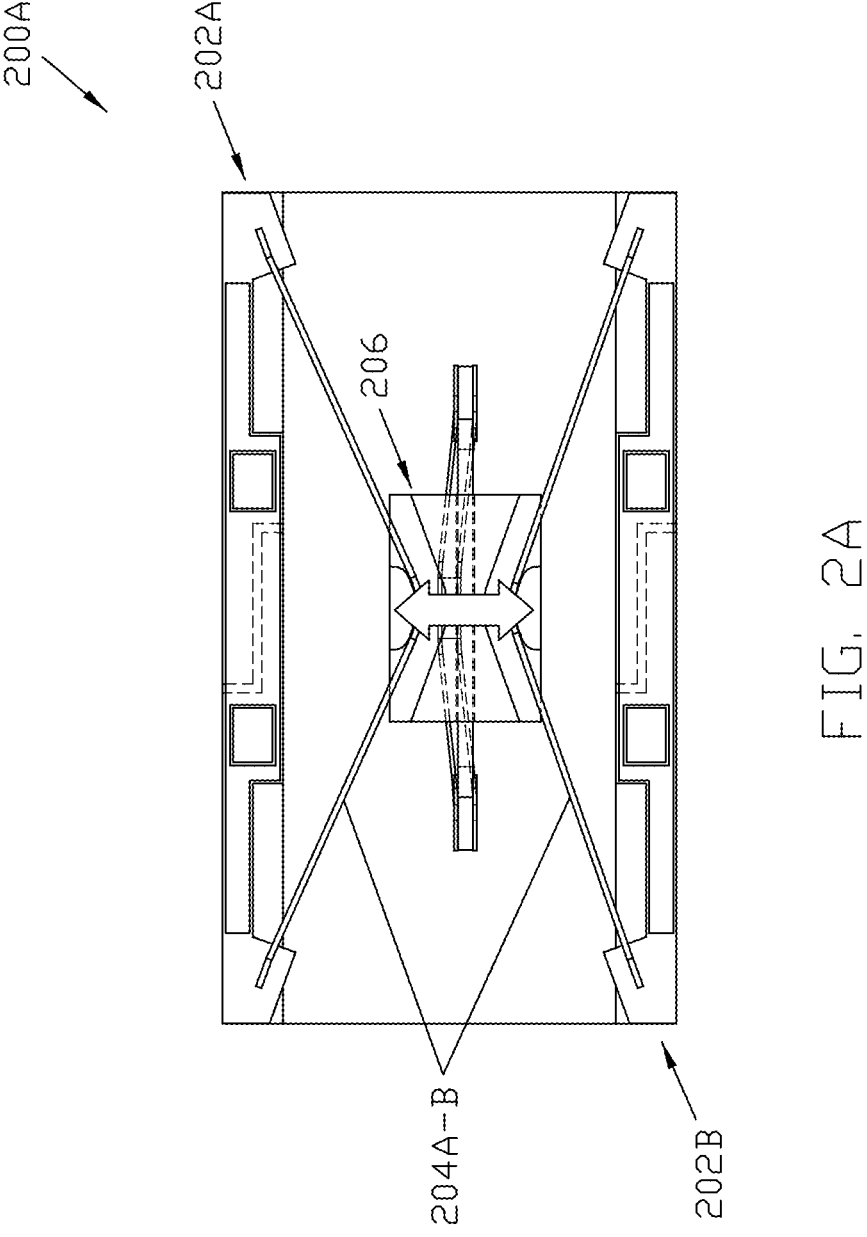
FIGS. 2A-2D illustrate views of an angled SMA bistable actuator switch according to some embodiments.

For instance, as shown in FIG. 2A, an angled SMA bistable actuator switch 200A can include SMA actuators 202A-B. Further, the SMA elements 204A-B can be connected to a bistable structure 206 at a center of the SMA elements.

The SMA actuators can include opposing SMA wires wrapped around a center pivot and fixed at a set angle. The SMA actuators can be attached to a power circuit at both ends (e.g., crimped, welded, or soldered). The moving carriage can be pulled by opposing SMA wires and fixed to a bistable structure (e.g., glued to the brace). In some instances, the moving carriage and brace could be made as one component. The bistable structure can have two stable positions and can be fixed to a base at its center. The bistable structure could also be built with ends fixed to the base and the center moving back and forth and attached to the moving carriage.

Figure 2B:
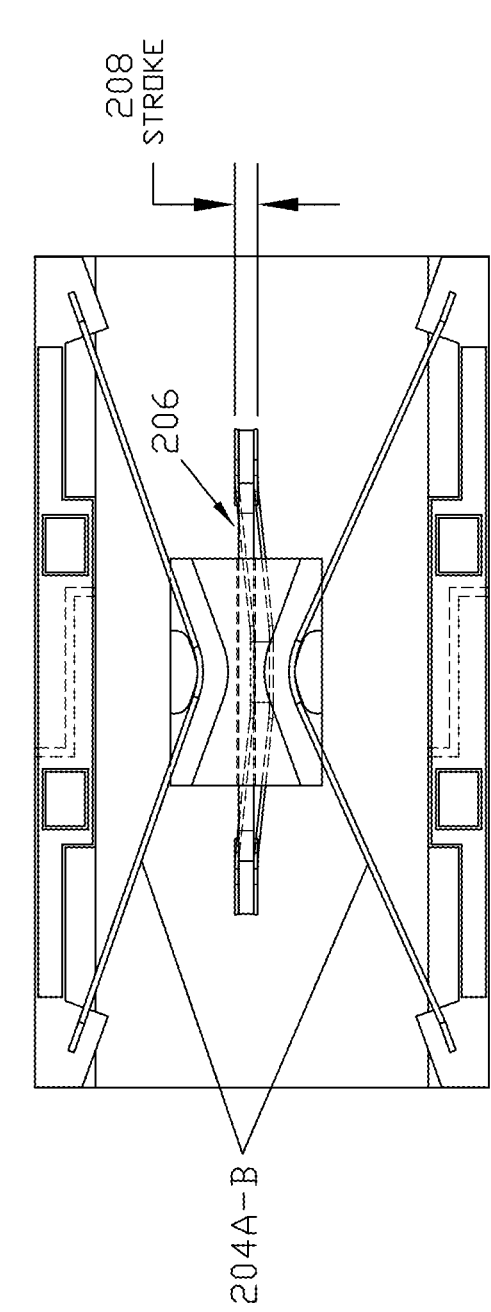

FIG. 2B illustrates a second view of the angled SMA bistable actuator switch 200B. As shown in FIG. 2B, as an SMA element (e.g., 204B) actuates, the bistable structure 206 can move from a first position to a second position. The range of motion of the bistable structure can be shown by stroke 208.

Figure 2C:
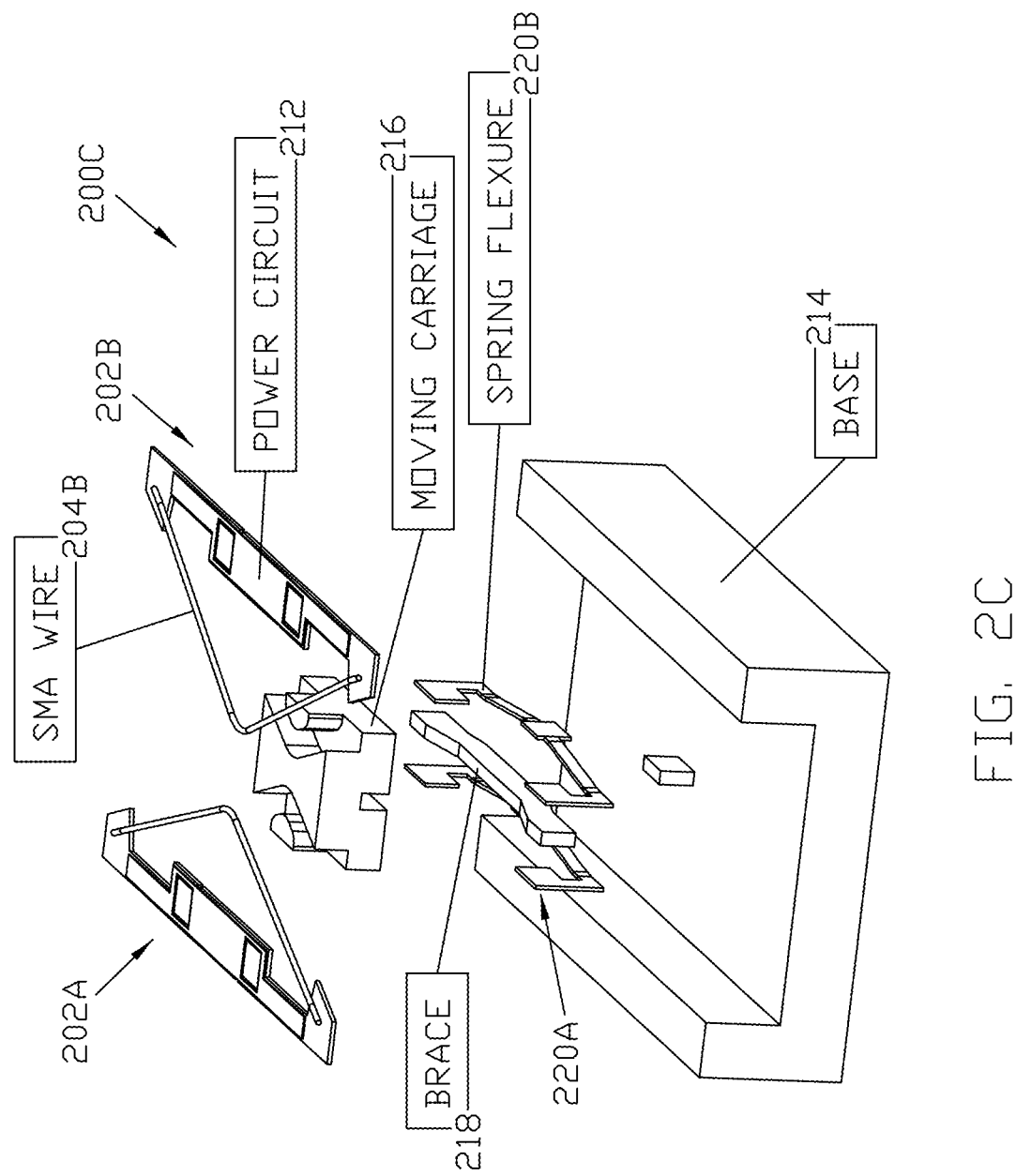

FIG. 2C illustrates an exploded view of the angled SMA bistable actuator switch 200C. As shown in FIG. 2C, the switch 200C can include SMA actuators 202A-B, SMA element 204B, power circuit 212 connected between the ends of the SMA element 204B. Further, the bistable structure can include a moving carriage 216, brace 218, and springs 220A-B. The SMA actuators 202A-B can be connected to base 214.

Figure 2D:
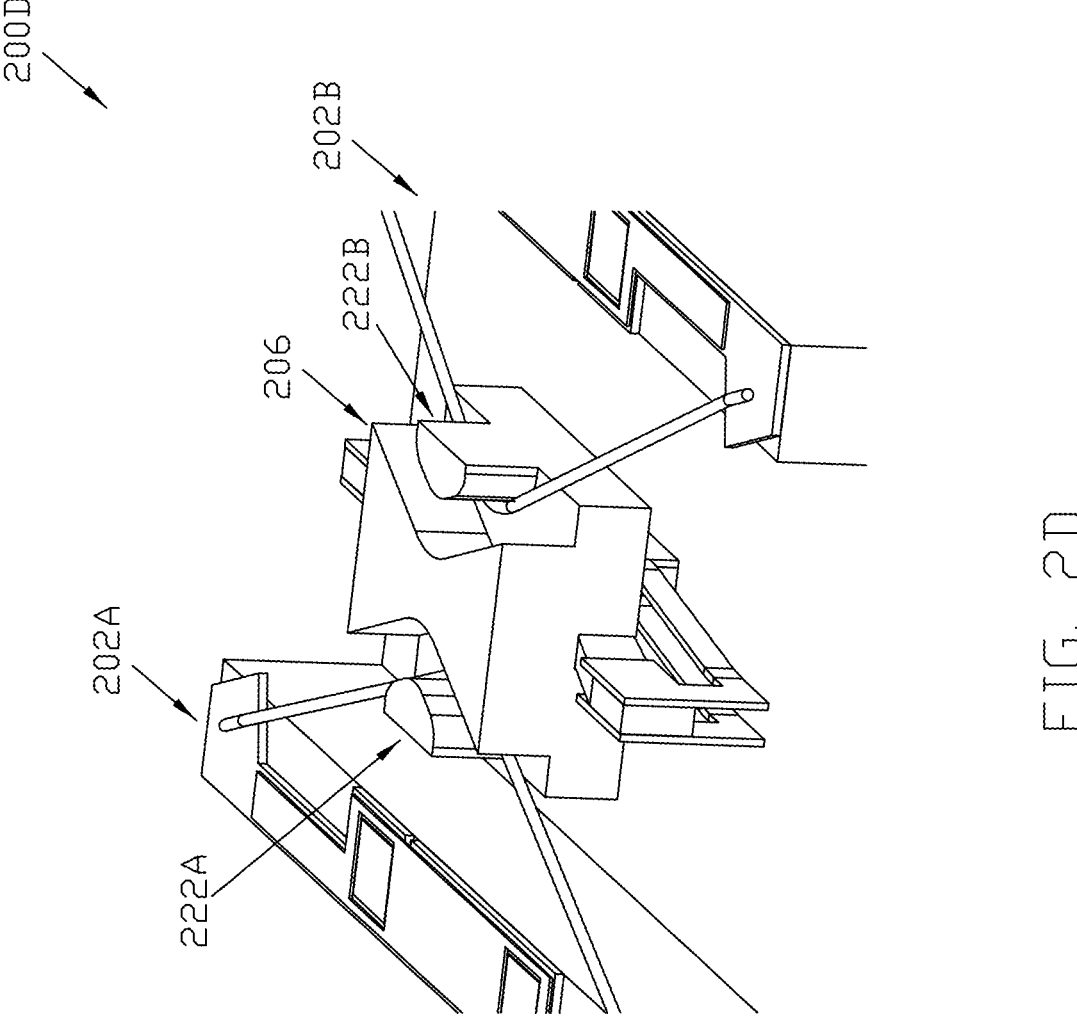

FIG. 2D illustrates a view of the angled SMA bistable actuator switch 200D. in FIG. 2D, the moving carriage can include multiple protrusions 222A-B. Each protrusion 222A-B can be configured to be disposed around the SMA elements to hold the bistable structure to the SMA actuators.

Figure 3A:
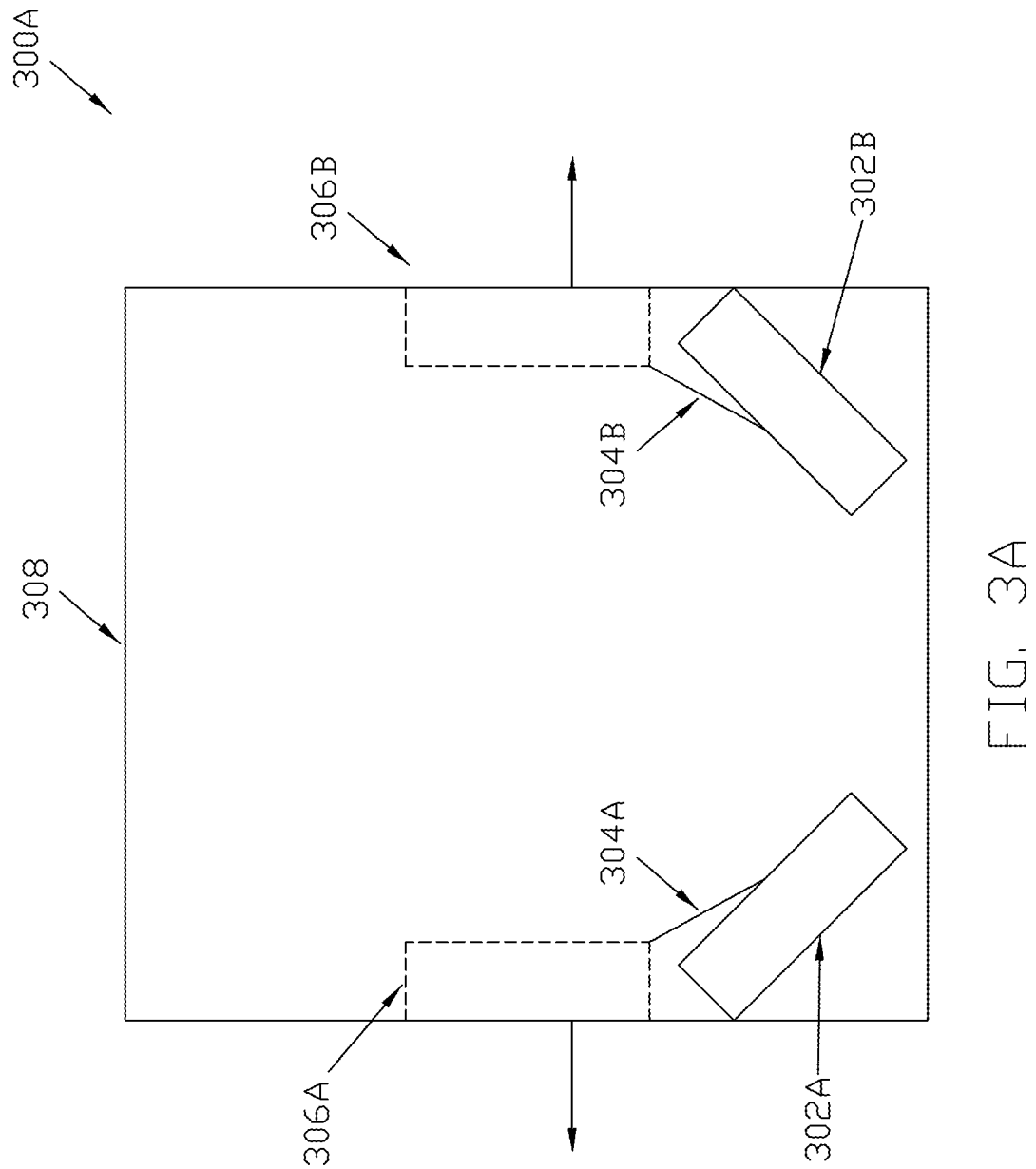
FIGS. 3A-C illustrate multiple actuators connected to a base according to some embodiments.
Figure 3B:
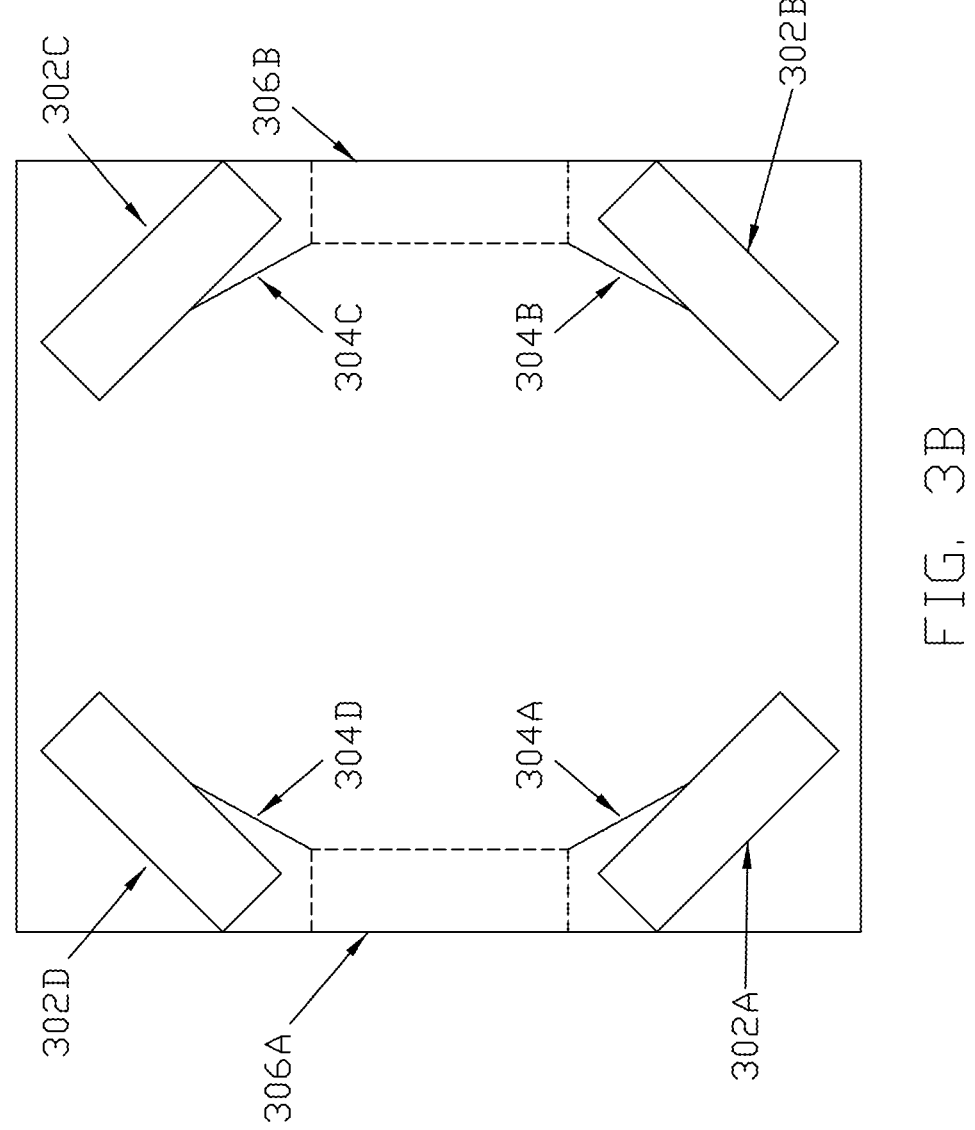
Figure 3C:
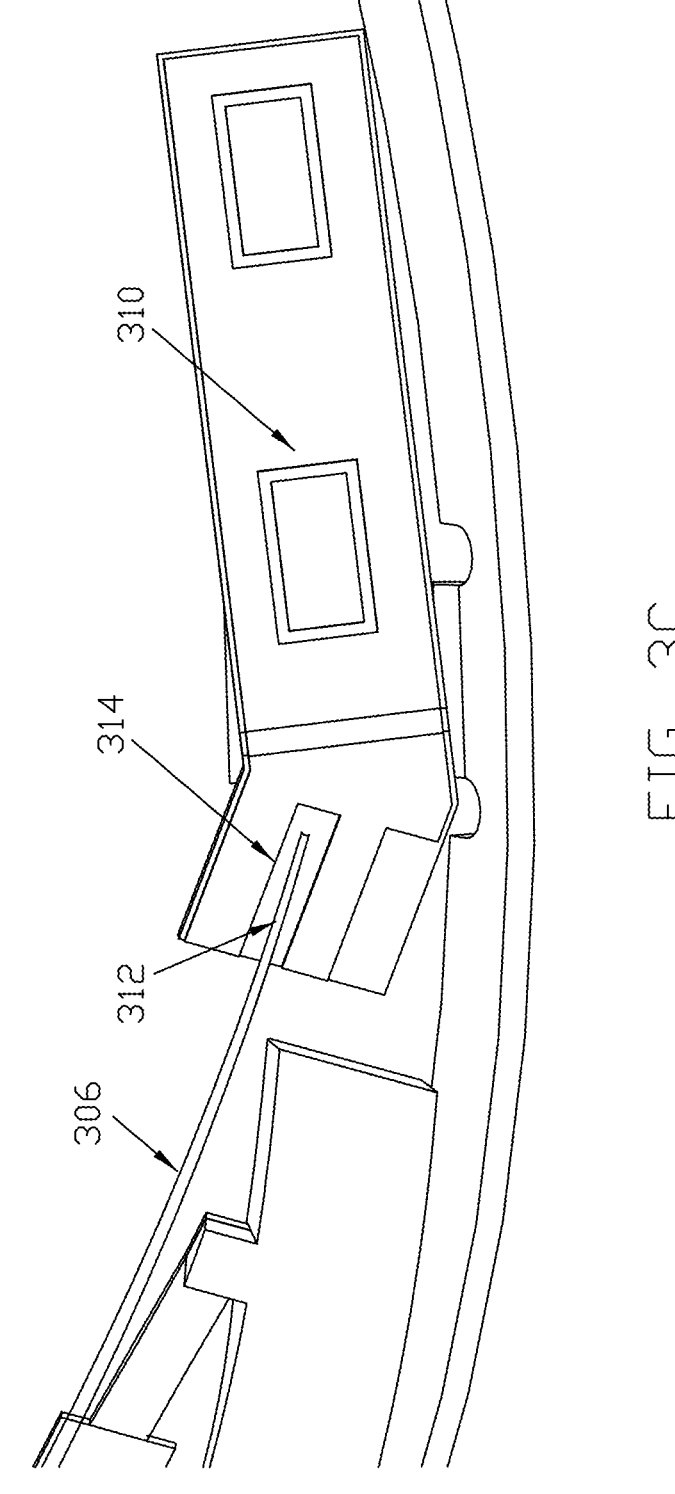

FIGS. 3A-C illustrate multiple actuators connected to a base 308. As shown in FIG. 3A, multiple actuators 302A-B can move a structure 306A-B that is connected to a base 308. For instance, an SMA element 304A-B can be actuated, which can move a corresponding structure 306A-B. FIG. 3B illustrates an embodiment with four actuators 302A-D connected to the base. As shown in FIG. 3B, each actuator 302A-B can connect to an SMA element 304A-D, which can be used to move structures 306A-B.

The moving carriages can be rigidly connected with a moving carriage base. Further, an angled SMA wire can attach to each moving carriage, with SMA wire ends fixed (e.g., crimped, welded, soldered) to the fixed base with isolated power circuits (e.g., isolated power circuits not shown). A moving carriage ring sub-assembly can swing back and forth between two stable positions. Further, a pair of stacked bistable springs can be parallel to each other or angled. In one embodiment, the bistable structures can be angled 25 degrees toward each other.

FIG. 3C illustrates an actuator connected to the base. As shown in FIG. 3C, the SMA element 306 can connect to a contact 314 at an end of the SMA element 312. The actuator can also include a circuit 310. The SMA wire can be resistance welded to the metal circuit or electrically isolated metal frame. The system can also use mechanical crimps to bond SMA wires as well.

SMA Buckler Actuator Switch

In another example embodiment, a SMA actuator switch is provided, which may be a buckler type actuator. The SMA buckler actuator switch can include multiple buckler actuators configured to move a bistable structure between two positions.

Figure 4A:
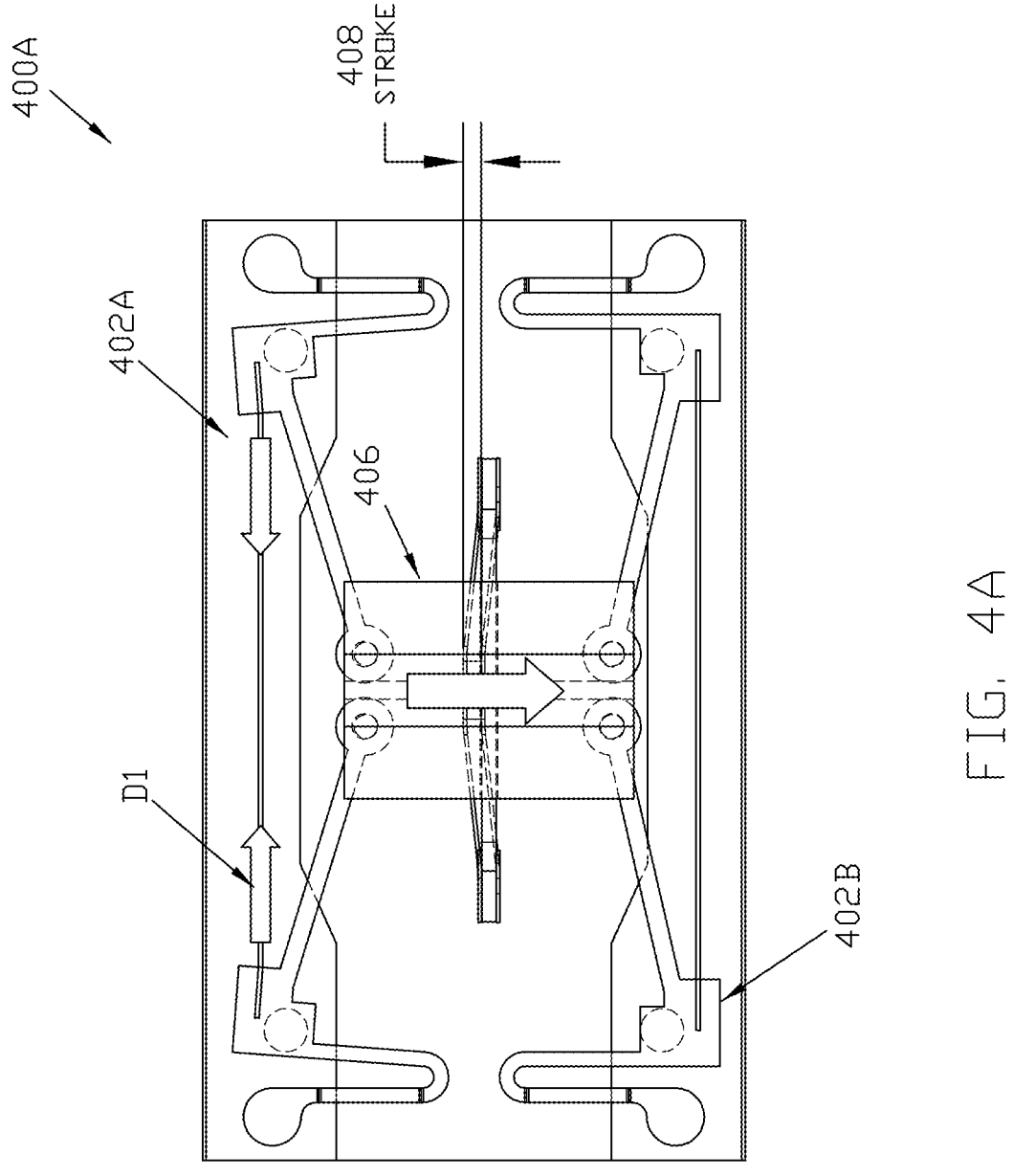
FIGS. 4A-4D illustrate various view of an example SMA buckler actuator switch according to some embodiments.

FIGS. 4A-4D illustrate various view of an example SMA buckler actuator switch. For example, as shown in FIG. 4A, the SMA buckler actuator switch 400A can include SMA buckle actuators 402A-B. Each buckle actuator can include load points connected to a base or other structure, with an SMA wire disposed between the load points. Further, the buckle actuators can include actuator arms extending from the load points, where the arms are configured to connect to the bistable structure 406.

The SMA buckler actuator switch 400A can also include a bistable structure 406. The structure 406 can include features similar to the bistable structure as described herein. The bistable carriage can move between positions in a range as shown by stroke 408. For example, actuator 402A can cause the SMA element to contract, causing a force in direction D1 to move the bistable structure 406 into a first position.

The opposing buckler actuators can push back and forth on the moving carriage. The buckler actuator can have a push motion that is in plane with actuator structure yet perpendicular to the SMA wire. The moving carriage can be fixed to a bistable structure (e.g., glued to a Brace). In some instances, the moving carriage and brace could be made as one component. The bistable structure can have two stable positions and can be fixed to a base at its center. In some instances, the bistable structure could also be built with ends fixed to the base and the center moving back and forth and attached to the moving carriage.

Figure 4B:
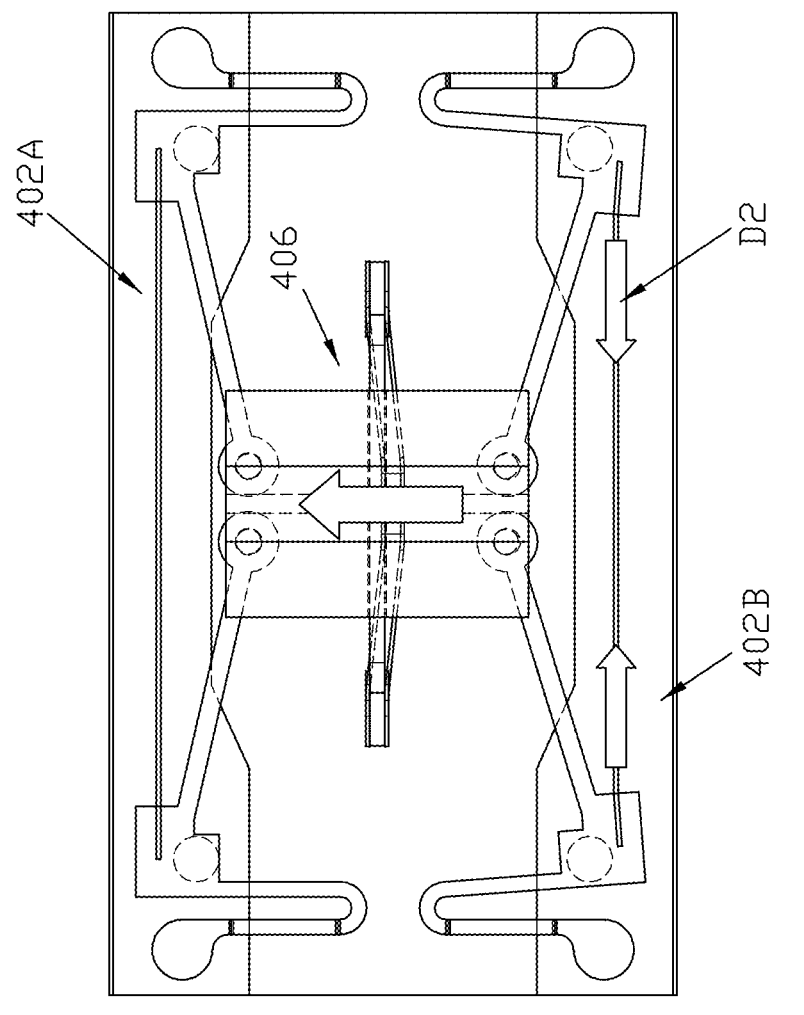

In the embodiment as shown in FIG. 4B, the switch 400B can include a second actuator 402B actuating the SMA wire in direction D2, causing the bistable carriage 406 to move to a second position.

Figure 4C:
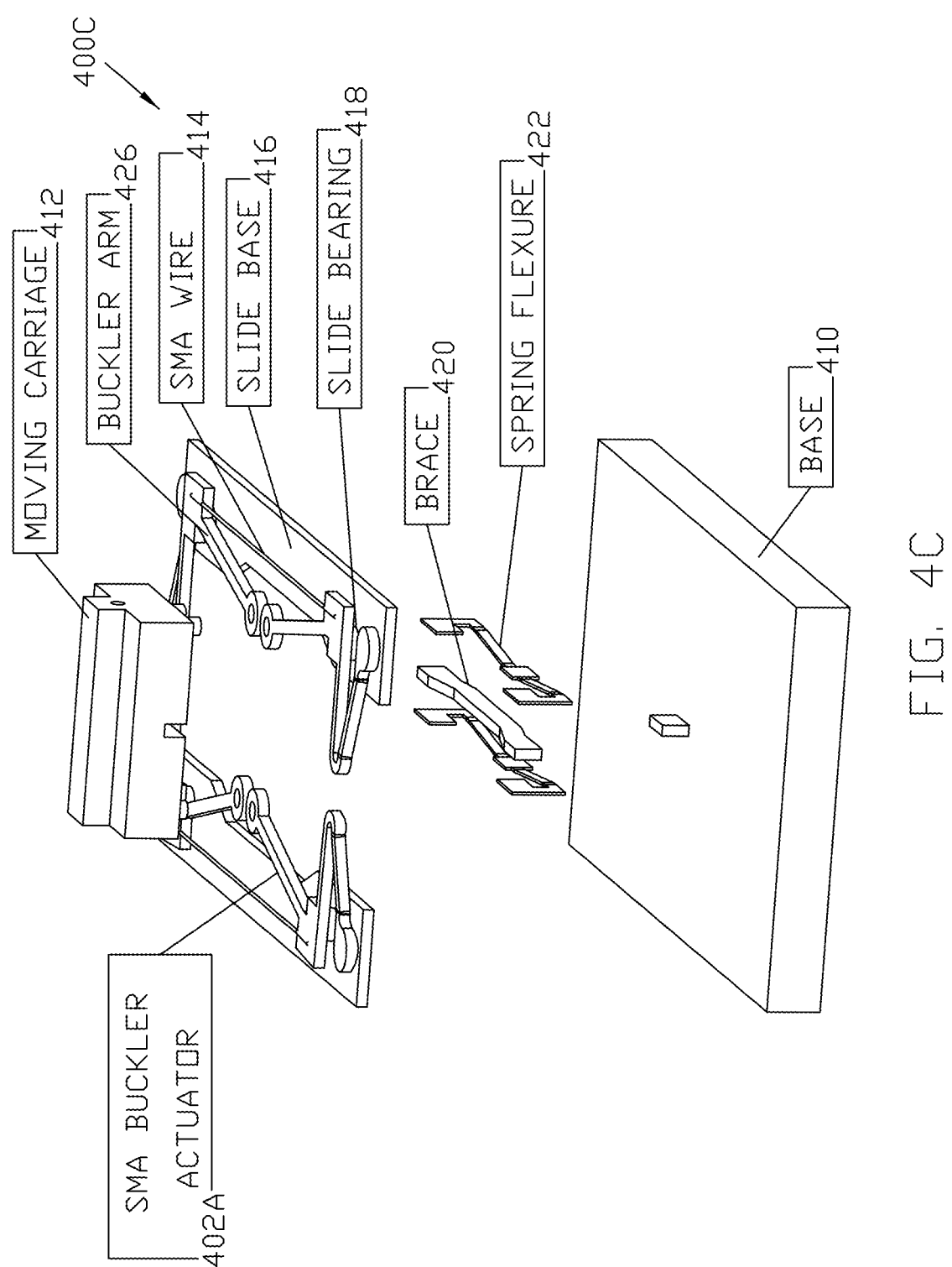

FIG. 4C is an exploded view of the SMA buckler actuator switch 400C. As shown in FIG. 4C, the actuators (e.g., 402A-B) can include a buckler arm 426, an SMA wire 414, a slide base 416, and a slide bearing 418. The bistable structure (e.g., 406) can include a moving carriage 412, a brace 420, and spring flexures (e.g., 422). The actuators 402A-B can be connected to a base 410.

Figure 4D:
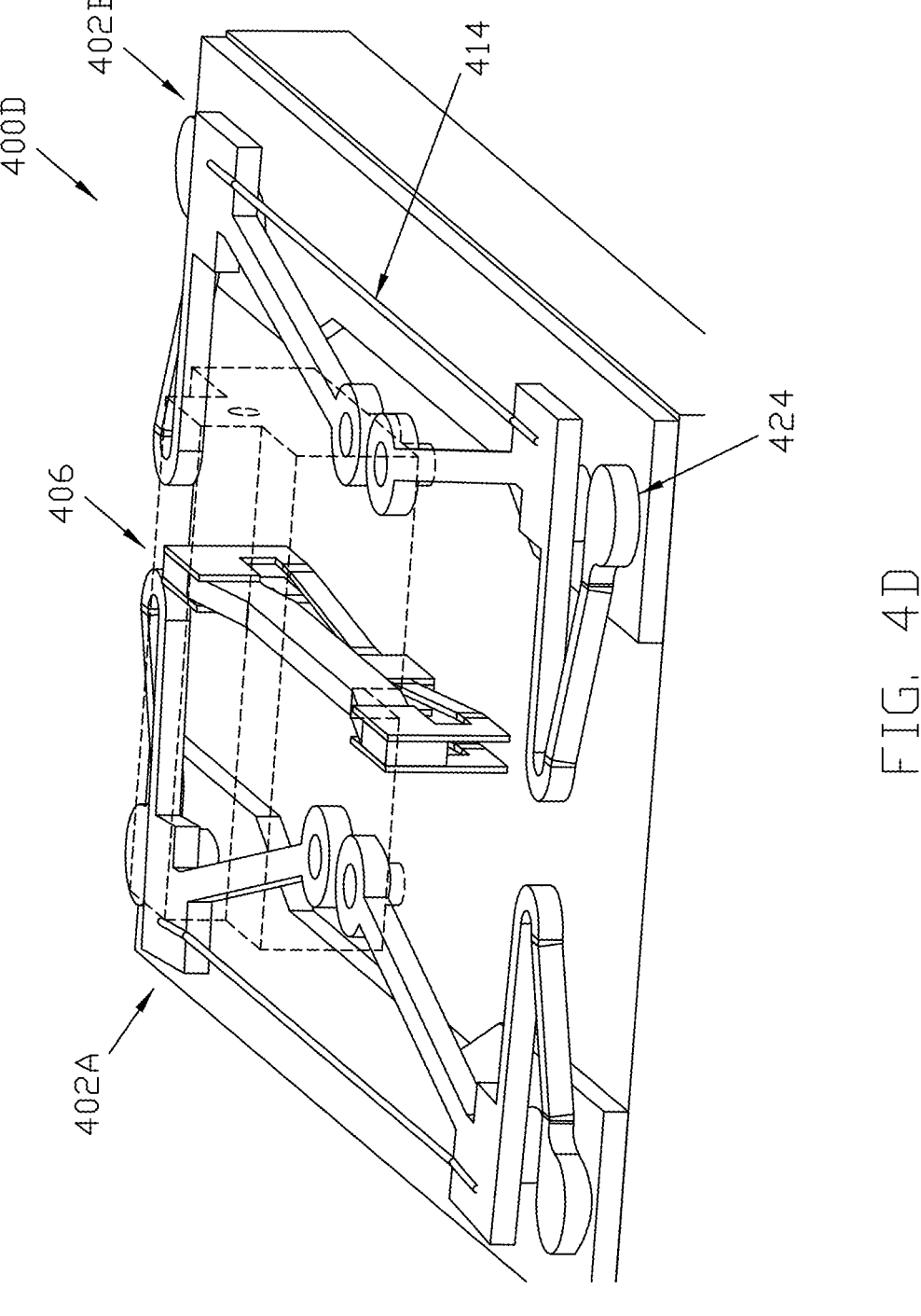

FIG. 4D illustrates a view of SMA buckler actuator switch 400D. As shown in FIG. 4D, the actuators 402A-B can connect to the bistable structure 406. Further, an actuator can include a SMA wire. Additionally, in some instances, spring feet (e.g., 424) can connect to load points on the actuator (e.g., 402B).

Bistable Actuator as a Latching Electrical Relay Switch

Figure 5A:
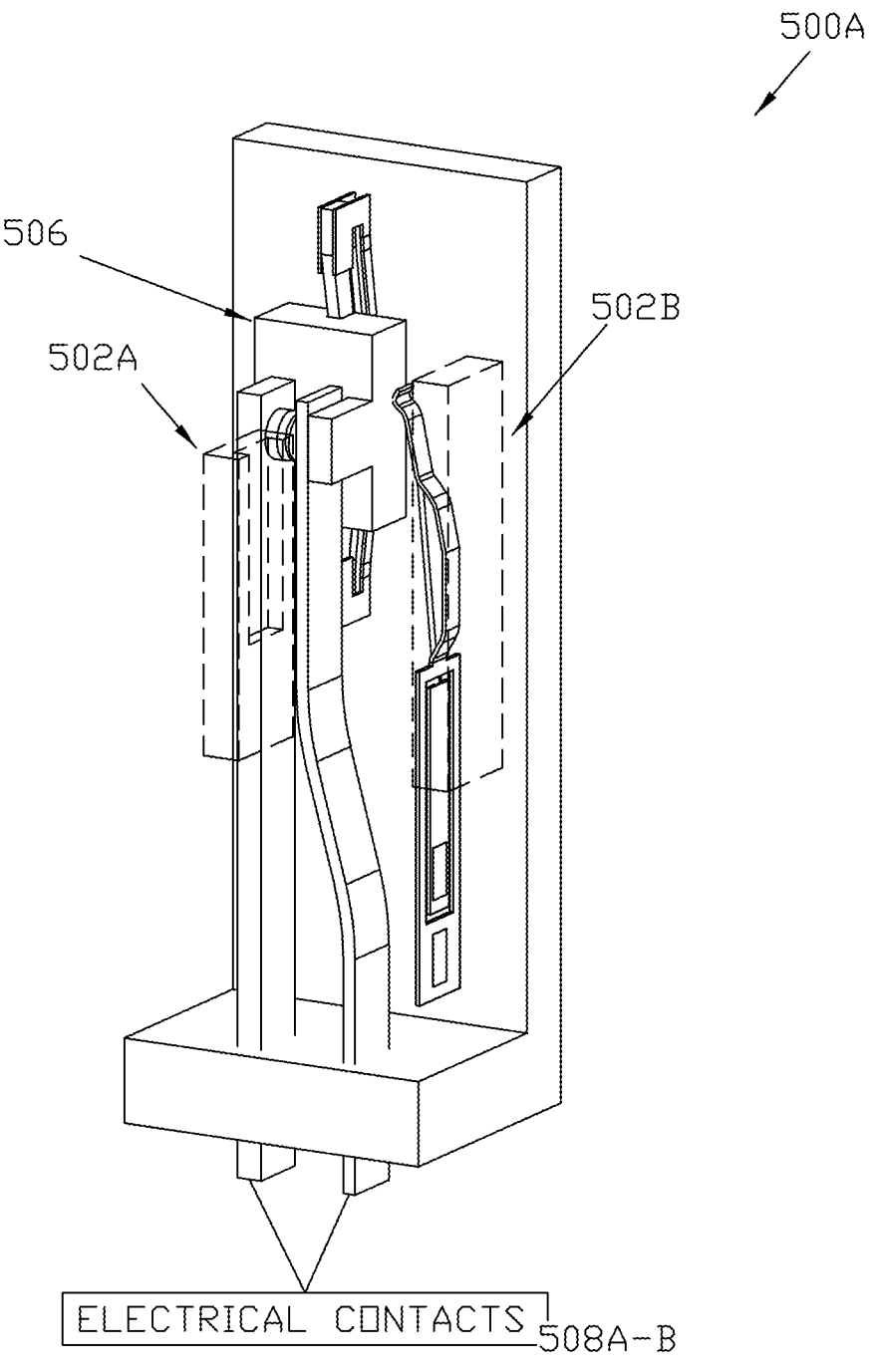
FIGS. 5A-5C illustrate various views of a bistable actuator as a latching electrical relay switch according to some embodiments.
Figure 5B:
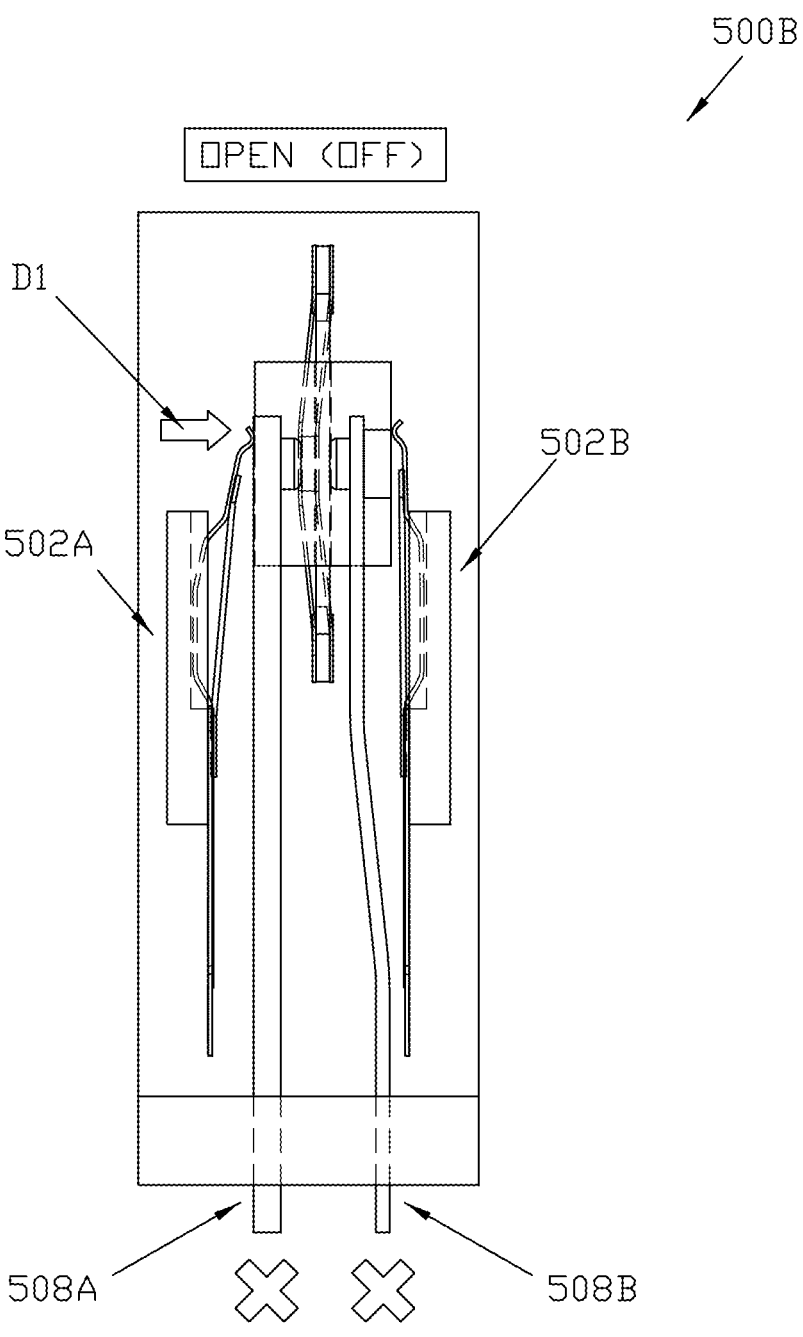
Figure 5C:
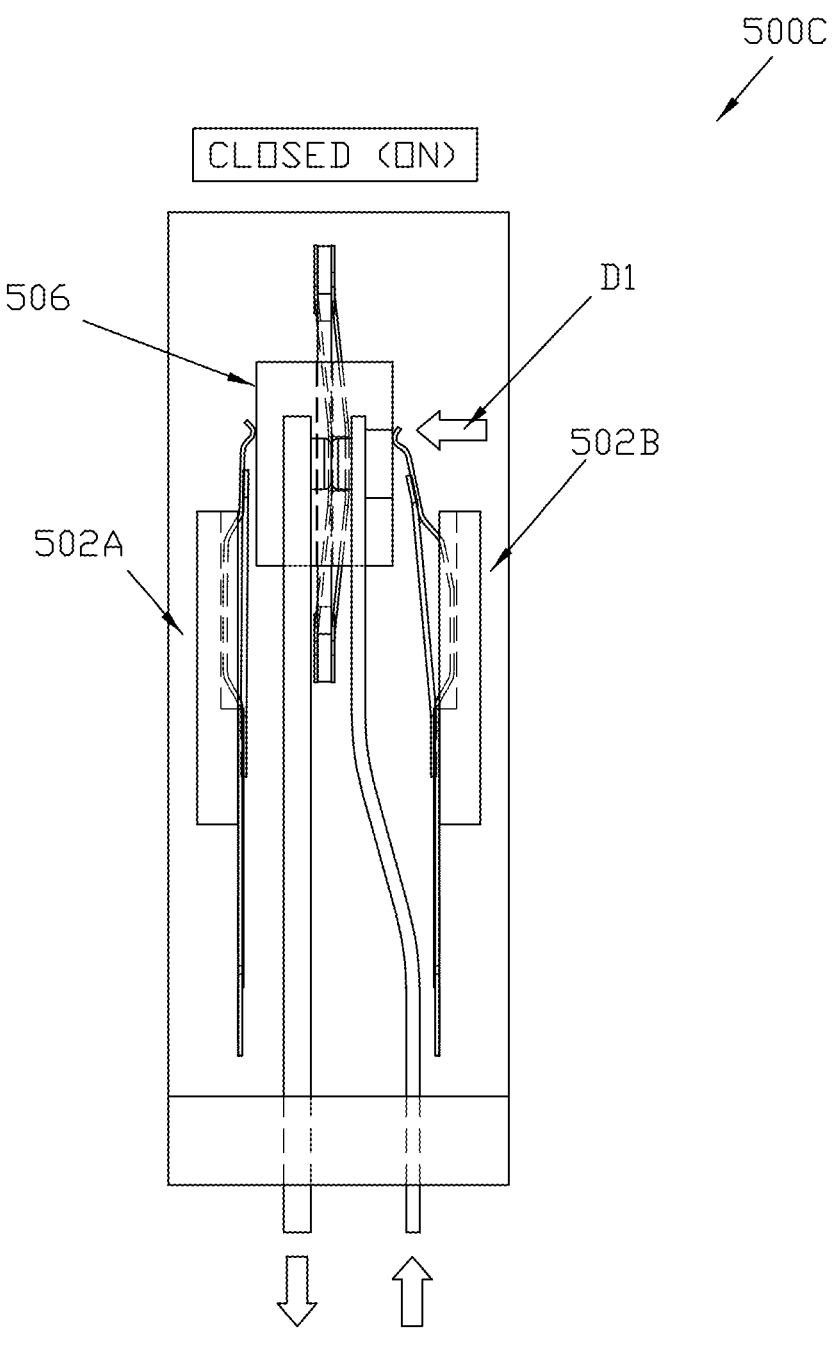

In some instances, a bistable actuator can be used as a latching electrical relay switch. FIGS. 5A-5C illustrate various views of a bistable actuator as a latching electrical relay switch. As shown in FIG. 5A, actuators 502A-B can connect to a bistable structure 506. The bistable structure 506 can move between two positions to engage/disengage the switch. For example, electrical contacts 508A-B can be disengaged at a first position. In FIG. 5B, a first actuator 502A can actuate, moving the bistable structure in a first position (e.g., open or off). In FIG. 5C, a second actuator 502B can actuate in a second direction D2, causing contacts to engage and turn the switch into a closed/on position.

In the present embodiments, the SMA actuator is shown running a latching electrical relay switch. Two positions of bistable actuator can turn and hold a circuit on and off. The SMA Bimorph actuators can oppose each other. In some instances, the switch can also be actuated with a buckler actuator or angled wire actuators as described herein. Linear motion of an actuator can deflect a cantilever or pivoting conductive beam to either touch (close switch) or release (open switch) contact with another conductive beam. The Bistable structure can ensure no change in electrical current flow when actuator is powered off. In some instances, the bistable structure can be removed, with opposing SMA bimorph in same configuration. This can allow for the same power on switching ability, but without a power off latching ability.

Bistable Actuator as a Directional Control Valve

Figure 6A:
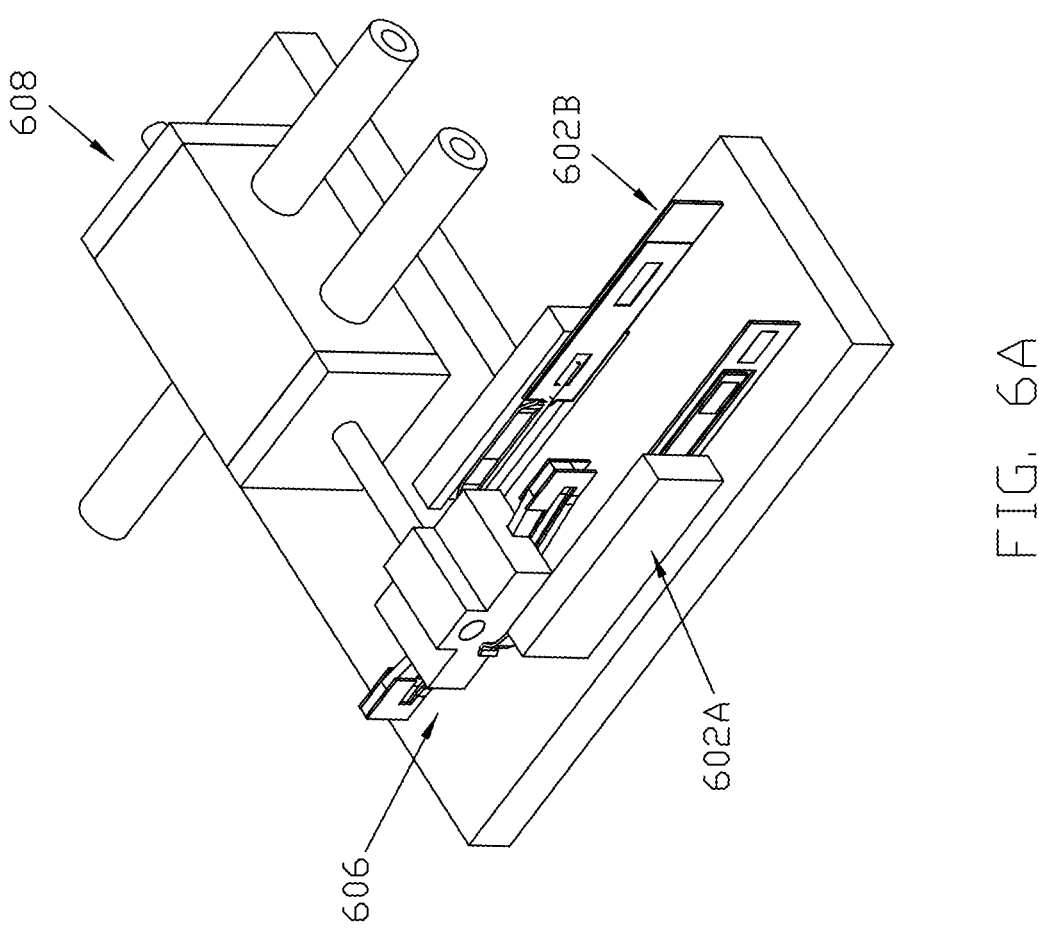
FIGS. 6A-C illustrate view of an SMA actuator as a directional control valve according to some embodiments.
Figure 6B:
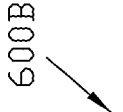
Figure 6B:
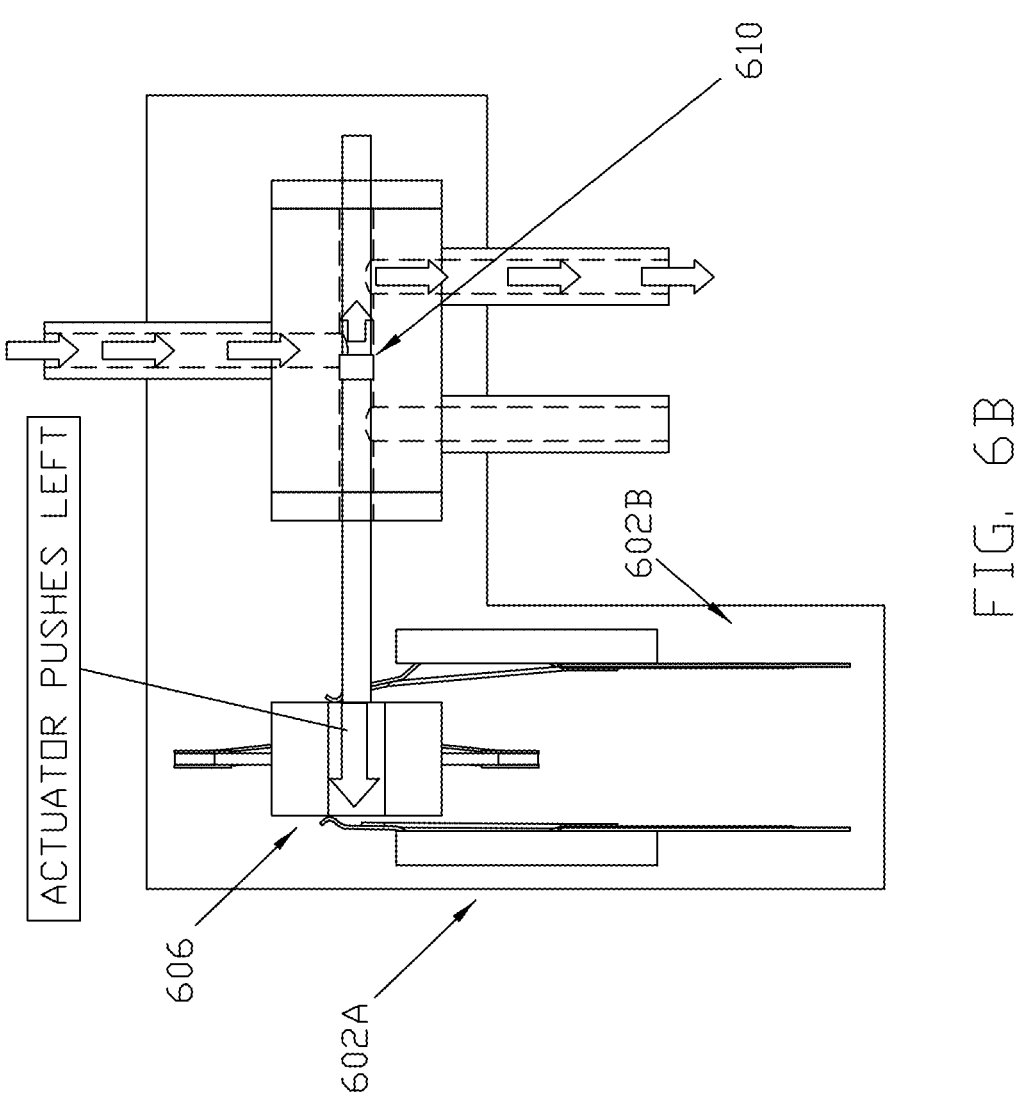
Figure 6C:
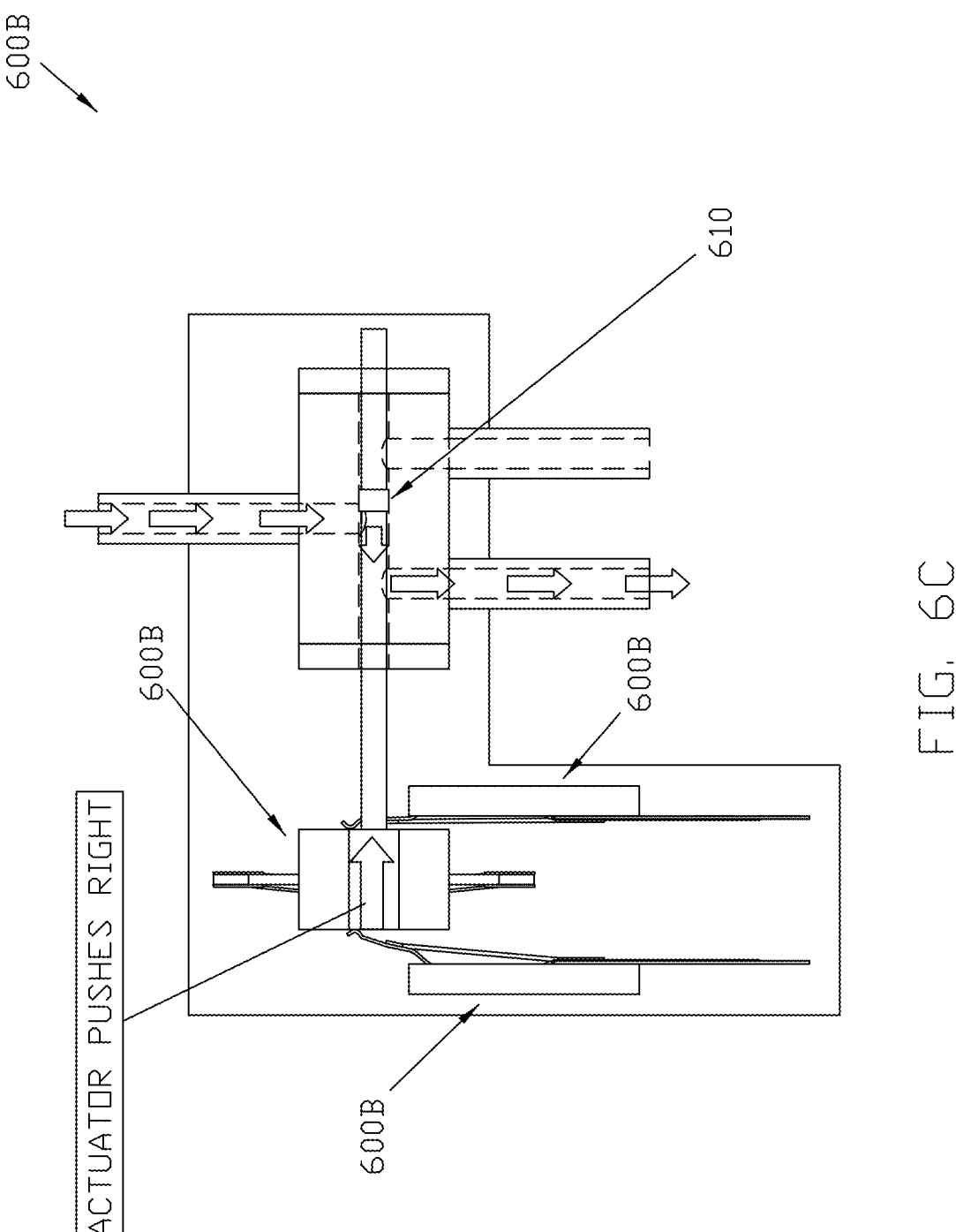

In another example, embodiment, a SMA actuator can run a directional control valve. FIGS. 6A-C illustrate view of an SMA actuator as a directional control valve. For example, as shown in FIG. 6A, the valve 600A can include actuators 602A-B and bistable structure 606. The bistable structure 606 can connect to the valve 608.

For example, as shown in FIG. 6B, a second actuator 602B can actuate, causing the bistable structure 606 to push left, opening a valve 610 to the left and allowing a first flow along a right channel. Further, in FIG. 6C, a first actuator 602A can actuate, causing the bistable structure 606 to push right, opening a valve 610 to the right and allowing a second flow along a left channel.

The bistable actuator can have two positions to control the flow of fluid or gas through the valve. Two SMA bimorph actuators can oppose one another. Further, the actuators can include buckler actuators or angled wire actuators as described herein. Linear motion of an actuator can push a shaft with a seal that switches fluid or gas direction. The bistable structure can ensure no direction change of fluid or gas during power off. In some instances, the system can remove bistable structure with opposing SMA bimorph in same configuration, which can result in the same power on direction control ability, but no power off holding ability.

Bistable SMA Bimorph Actuators as a Diaphragm Pump

In another example embodiment, a bistable actuator can be used as a diaphragm pump. Two diaphragms and chambers can be disposed on either side of a SMA Bistable Actuator. The SMA actuators can include bimorph actuators opposing one another. In some instances, the actuators can include buckler actuators or angled wire actuators.

Linear motion of an actuator can push fluid out of one chamber while pulling fluid into the other chamber. Line pressure can open and close ball valves to direct fluid in correct direction. Further, the bistable structure can ensure no back flow of fluid during power off. In some instances, the system can remove the bistable structure with opposing SMA bimorph in same configuration, which can result in the same power on pumping ability, but no power off holding ability.

Figure 7A:
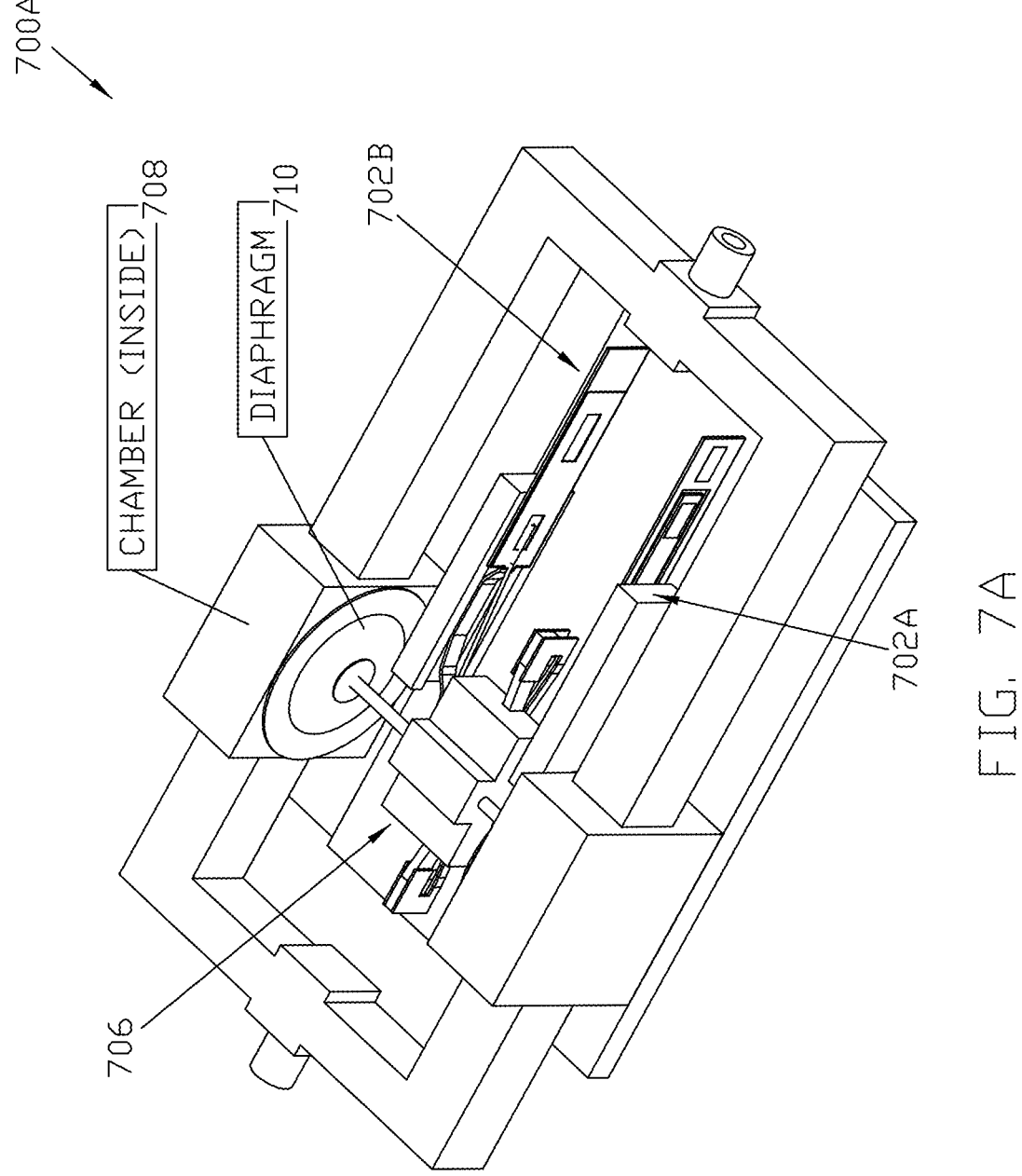
FIGS. 7A-7C illustrate various views of a SMA actuator as a diaphragm pump according to some embodiments.
Figure 7B:
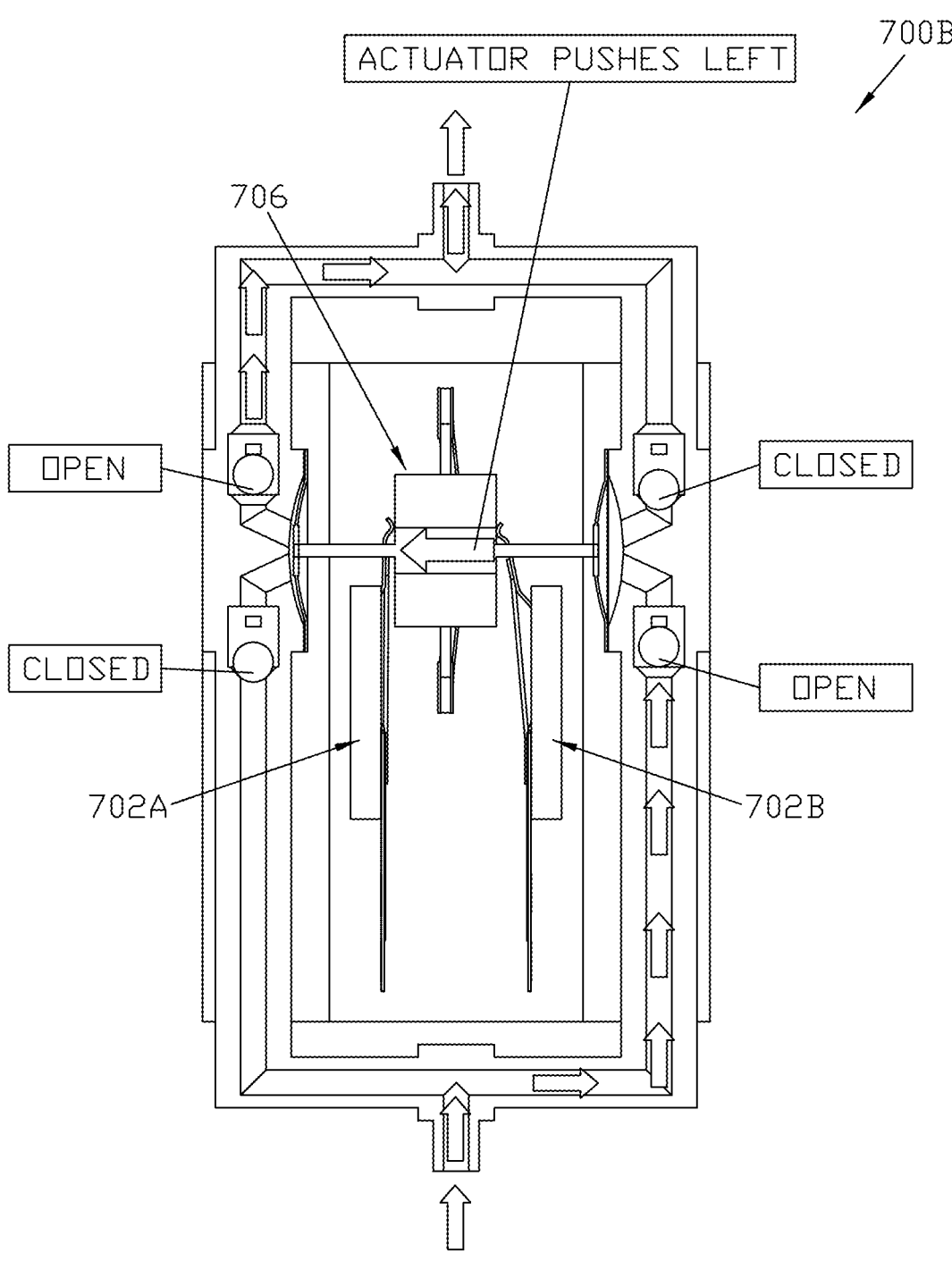
Figure 7C:
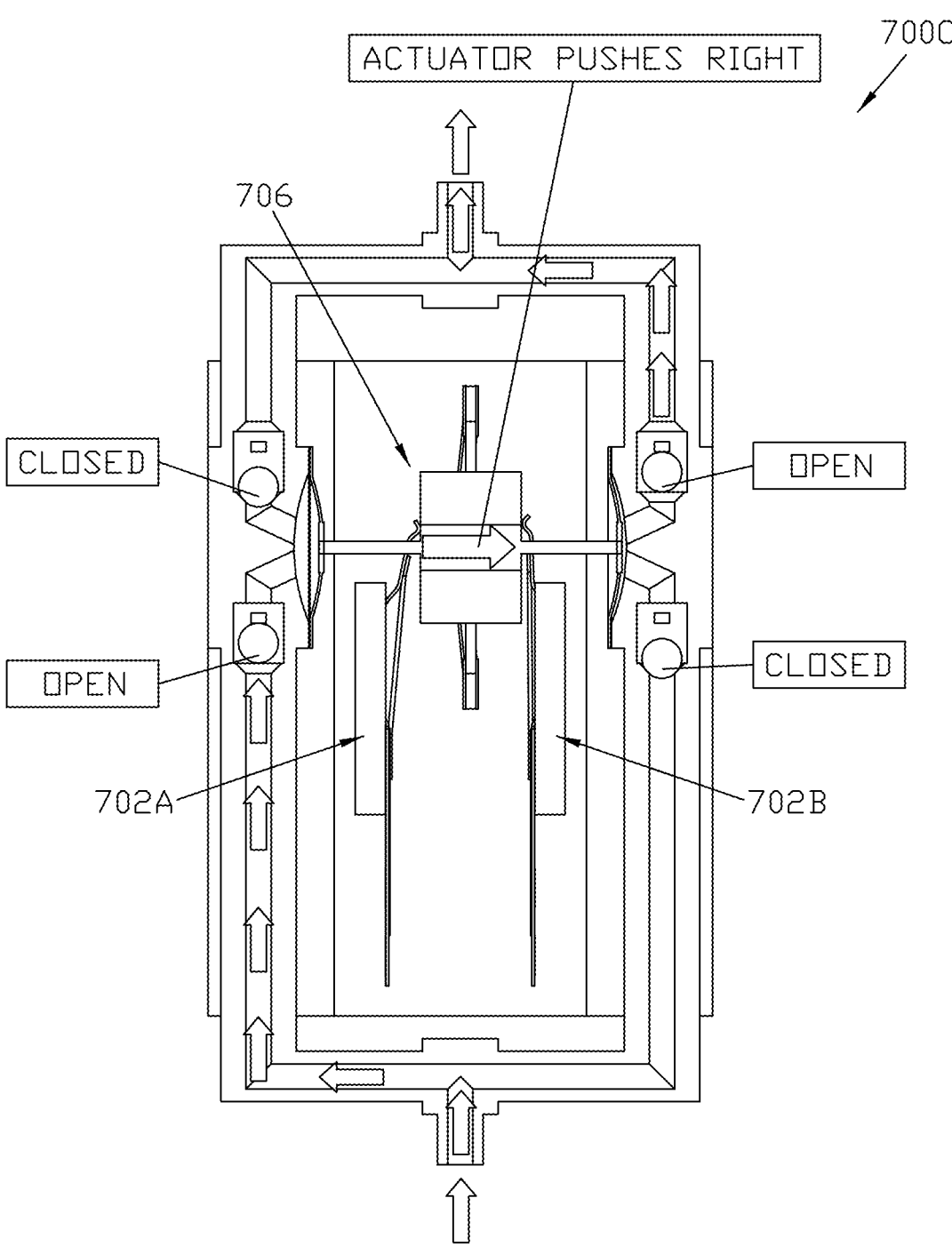

FIGS. 7A-7C illustrate various views of a SMA actuator as a diaphragm pump. For example, as shown in FIG. 7A, pump 700A can include actuators 702A-B, a bistable structure 706, and a diaphragm 710 with a chamber 708.

As shown in FIG. 7B, a second actuator 702B can actuate, causing the bistable structure 706 to move to a left position. Further, the diaphragm 710 can have a top left chamber open and a bottom left chamber closed, and a top right chamber closed and a bottom right chamber open. This can allow a fluid or gas to flow through the bottom right chamber to the upper left chamber.

In FIG. 7C, the first actuator 702A can actuate, causing the bistable structure 706 to move to a right position. Further, the diaphragm 710 can have a top left chamber closed and a bottom left chamber open, and a top right chamber open and a bottom right chamber closed. This can allow a fluid or gas to flow through the bottom left chamber to the upper right chamber.

SMA Buckler Actuators as a Diaphragm Pump

In another example embodiment, the bistable actuator can include buckler actuators as a diaphragm pump. The bistable actuator can include two diaphragms and chambers on either side of a SMA Bistable Actuator. Two SMA Buckler actuators can oppose each other. In some instances, the actuators can include bimorph actuators or angled wire actuators.

Linear motion of an actuator can push fluid out of one chamber while pulling fluid into the other chamber. Line pressure can open and close ball valves to direct fluid in correct direction. The bistable structure can ensure no back flow of fluid during power off.

Figure 8A:
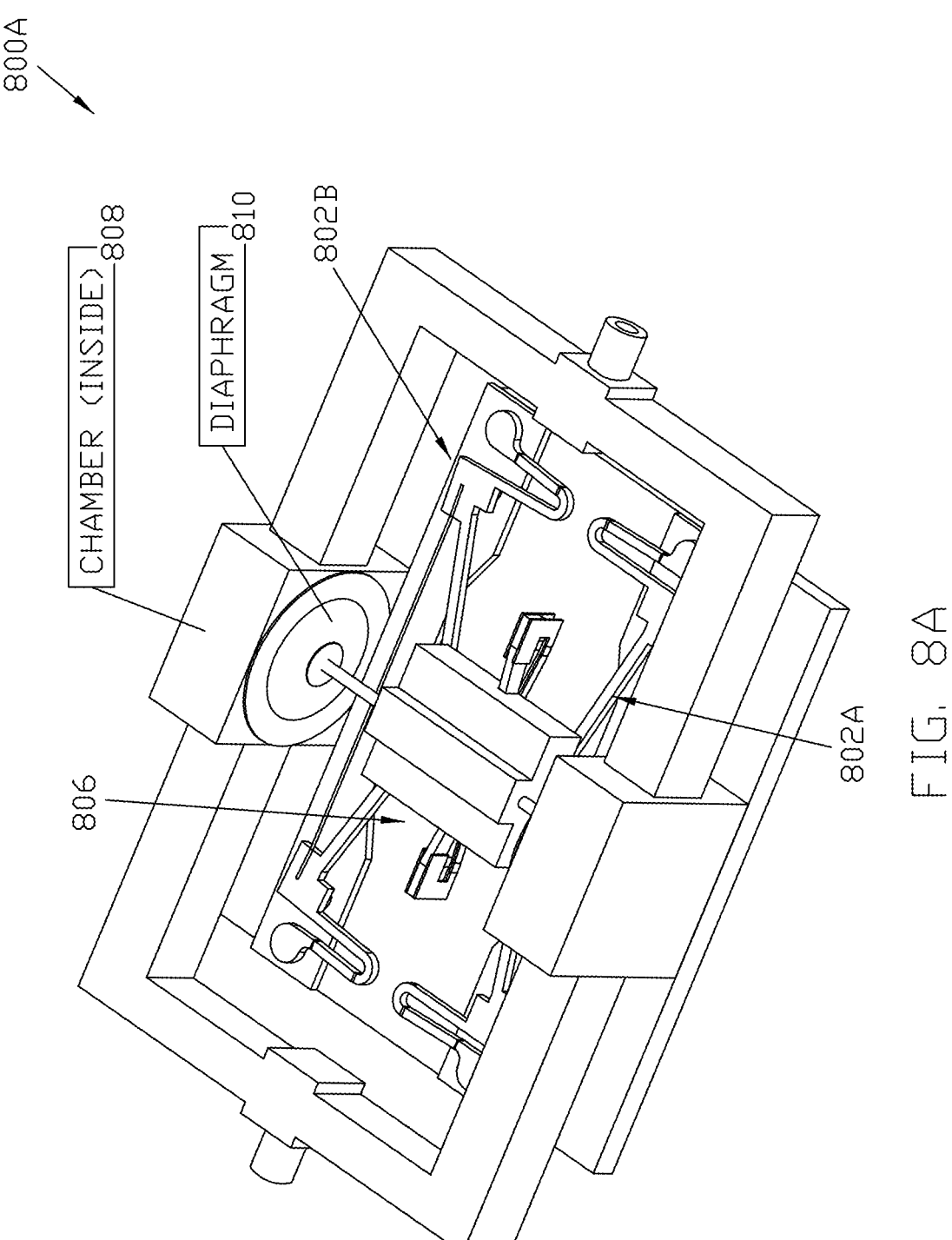
FIGS. 8A-8C illustrate various views of a SMA actuator as a diaphragm pump according to some embodiments.
Figure 8B:
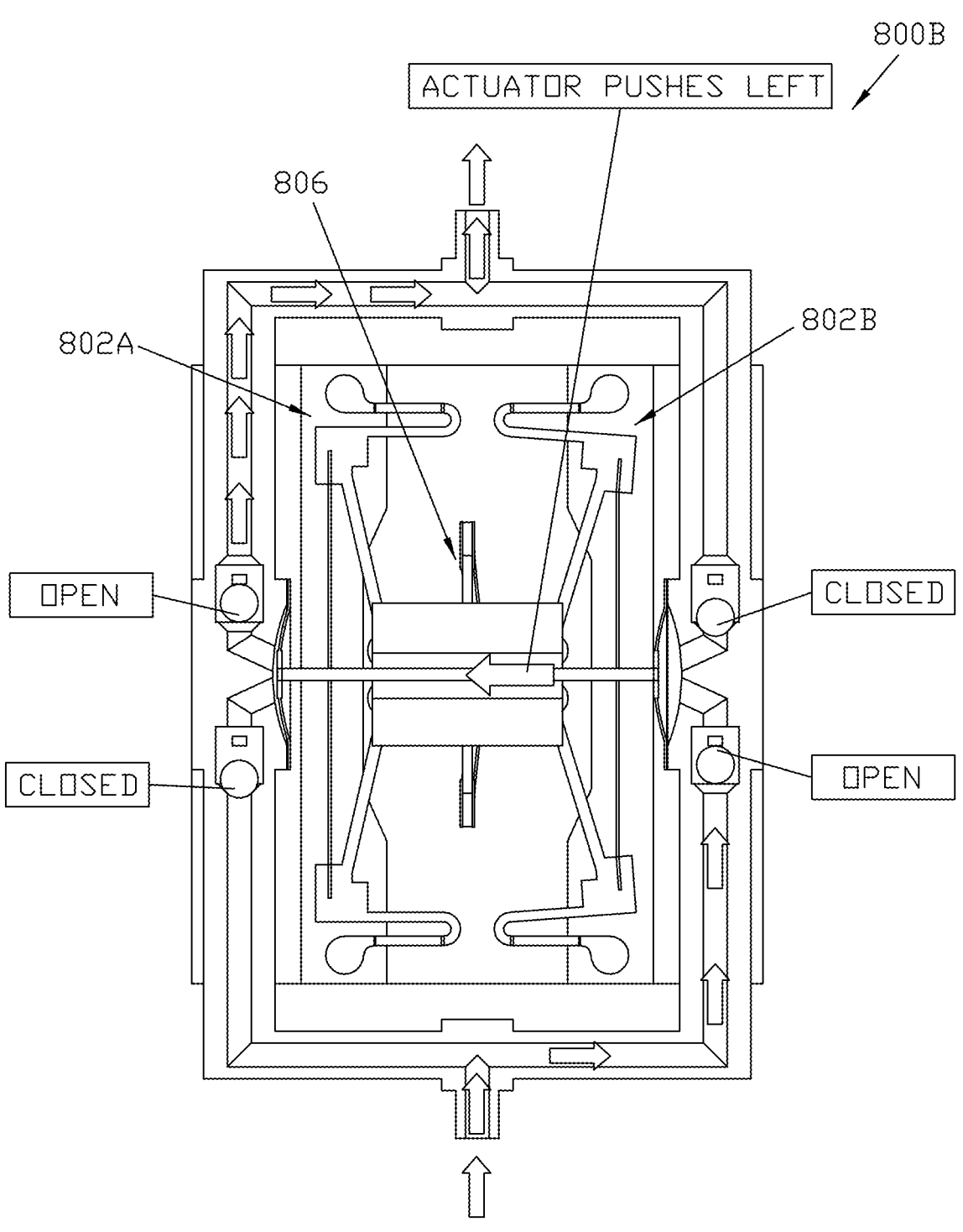
Figure 8C:
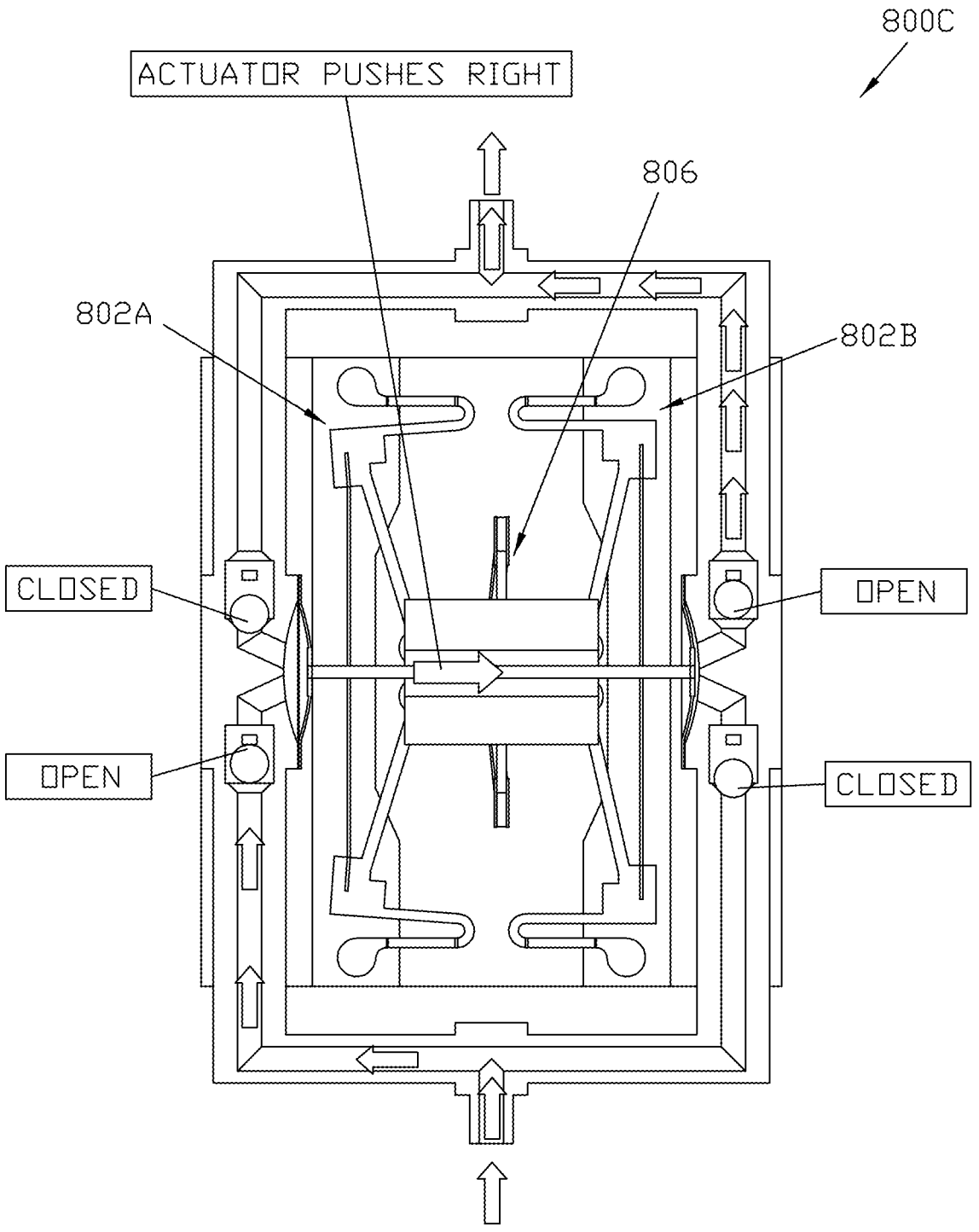

FIGS. 8A-8C illustrate various views of a SMA actuator as a diaphragm pump. For example, as shown in FIG. 8A, pump 800A can include buckler actuators 802A-B, a bistable structure 806, and a diaphragm 810 with a chamber 808.

As shown in FIG. 8B, a second actuator 802B can actuate, causing the bistable structure 806 to move to a left position. Further, the diaphragm 810 can have a top left chamber open and a bottom left chamber closed, and a top right chamber closed and a bottom right chamber open. This can allow a fluid or gas to flow through the bottom right chamber to the upper left chamber.

In FIG. 8C, the first actuator 802A can actuate, causing the bistable structure 806 to move to a right position. Further, the diaphragm 810 can have a top left chamber closed and a bottom left chamber open, and a top right chamber open and a bottom right chamber closed. This can allow a fluid or gas to flow through the bottom left chamber to the upper right chamber.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

According to some embodiments, the processes described herein are used to form one or more of any of mechanical structures and electro-mechanical structures.

Although described in connection with these embodiments, those of skill in the art will recognize that changes can be made in form and detail without departing from the spirit and scope of the invention.

What is claimed is:

1. A bistable actuator comprising:
a first actuator and a second actuator, wherein the first actuator comprising a first shape memory alloy (SMA) element and the second actuator comprising a second SMA element;
a bistable structure connected to each of the first actuator and the second actuator such that the first actuator is connected at a first side of the bistable structure and the second actuator is connected at a second side of the bistable structure opposite the first side, the bistable structure configured to move between a first position and a second position responsive to actuation the first actuator or the second actuator, the bistable structure comprising:
a moving carriage connecting the bistable structure to each of the first actuator and the second actuator;
a brace; and
at least two springs connected to the brace, wherein each of the at least two springs provide a force that is configured to hold the bistable structure in either the first position or the second position.

2. The bistable actuator of claim 1, wherein the first actuator is disposed opposite to the second actuator.

3. The bistable actuator of claim 2, wherein the first actuator is configured to supply an electrical current to the first SMA element, causing the first SMA element to contract and to move the moving carriage into the first position, and wherein the second actuator is configured to supply the electrical current to the second SMA element, causing the second SMA element to contract and to move the moving carriage into the second position.

4. The bistable actuator of claim 1, wherein any of the first actuator and the second actuator further includes:

an actuator base;

a beam, wherein a first end of the beam is fixed to the actuator base, wherein a second end of the beam is unfixed from the actuator base and is connected to the moving carriage, and wherein each SMA element is connected to the first end and the second end of the beam.

5. The bistable actuator of claim 1, wherein any of the first actuator and the second actuator further includes:

an actuator circuit; and a first load point and a second load point disposed on opposing ends of the actuator circuit, wherein each SMA element is connected to the first load point and the second load point, with a central portion of each SMA element being disposed around a protrusion extending from the moving carriage.

6. The bistable actuator of claim 1, wherein any of the first actuator and the second actuator further includes:

a slide base;

a first load point and a second load point disposed on opposing ends of the slide base, wherein each SMA element is connected to the first load point and the second load point; and a first actuator arm extending from the first load point and a second actuator arm extending from the second load point, wherein each of the first actuator arm and the second actuator arm connected to the moving carriage.

7. The bistable actuator of claim 1, further comprising:

at least a first and a second electrical contact connected to the moving carriage, wherein the first position of the bistable structure electrically isolates the first electrical contact from the second electrical contact, and wherein the second position of the bistable structure electrically connects the first electrical contact to the second electrical contact.

8. The bistable actuator of claim 1, further comprising:

a directional control valve connected to the moving carriage, wherein the first position of the bistable structure moves a seal of the directional control valve to allow for a fluid or gas to flow into a first channel, and wherein the second position of the bistable structure moves the directional control valve to allow for the fluid or gas to flow into a second channel.

9. The bistable actuator of claim 1, further comprising:

at least a first diaphragm and a second diaphragm connected to the moving carriage, wherein each of the first diaphragm and the second diaphragm configured to pull a fluid or gas from a first chamber and push the fluid or gas into a second chamber, with the first position of the bistable structure pushes each diaphragm to direct the fluid or gas in a first flow direction, and wherein the second position of the bistable structure pushes each diaphragm to direct the fluid or gas in a second flow direction.

10. A method comprising:

providing, to a first SMA element of a first actuator, a current to cause the first SMA element to contract, moving a bistable structure connected to the first actuator into a first position;

providing, to a second SMA element of a second actuator, the current to cause the second SMA element to contract, moving the bistable structure into a second position, wherein the first actuator is connected at a first side of the bistable structure and the second actuator is connected at a second side of the bistable structure opposite the first side; and where a force provided by a first spring connected to a brace of the bistable structure and a force provided by a second spring connected to the brace of the bistable structure together holds the bistable structure in the first and second positions.

11. The method of claim 10, wherein the first actuator is disposed opposite to the second actuator.

12. The method of claim 10, wherein the first position of the bistable structure electrically isolates a first electrical contact from a second electrical contact connected to the bistable structure, and wherein the second position of the bistable structure electrically connects the first electrical contact to the second electrical contact.

13. The method of claim 10, wherein the first position of the bistable structure moves a seal of a directional control valve connected to the bistable structure to allow for a fluid or gas to flow into a first channel, and wherein the second position of the bistable structure moves the directional control valve to allow for the fluid or gas to flow into a second channel.

14. The bistable actuator of claim 1, wherein each of a first diaphragm and a second diaphragm are connected to the bistable structure and configured to pull a fluid or gas from a first chamber and push the fluid or gas into a second chamber, with the first position of the bistable structure pushes each diaphragm to direct the fluid or gas in a first flow direction, and wherein the second position of the bistable structure pushes each diaphragm to direct the fluid or gas in a second flow direction.

15. A shape memory alloy micro valve actuator comprising:

a first actuator and a second actuator, wherein the first actuator comprising a first shape memory alloy (SMA) element and the second actuator comprising a second SMA element;

a bistable structure connected to each of the first actuator and the second actuator, the bistable structure configured to move between a first position and a second position responsive to actuation the first actuator or the second actuator, the bistable structure comprising:

a moving carriage connecting the bistable structure to each of the first actuator and the second actuator;

a brace;

at least two springs connected to the brace, wherein each of the at least two springs provide a force that is configured to hold the bistable structure in either the first position or the second position and;

wherein the first actuator connected at a first side of the bistable structure and the second actuator is connected at a second side of the bistable structure opposite the first side.

16. The shape memory alloy micro valve actuator of claim 15, wherein the first actuator is configured to supply an electrical current to the first SMA element, causing the first SMA element to contract and to move the moving carriage into the first position, and wherein the second actuator is configured to supply the electrical current to the second SMA element, causing the second SMA element to contract and to move the moving carriage into the second position.

17. The shape memory alloy micro valve actuator of claim 15, wherein any of the first actuator and the second actuator further includes:

an actuator base;

a beam, wherein a first end of the beam is fixed to the actuator base, wherein a second end of the beam is unfixed from the actuator base and is connected to the moving carriage, and wherein each SMA element is connected to the first end and the second end of the beam.

18. The shape memory alloy micro valve actuator of claim 15, wherein any of the first actuator and the second actuator further includes:

a slide base;

a first load point and a second load point disposed on opposing ends of the slide base, wherein each SMA element is connected to the first load point and the second load point; and a first actuator arm extending from the first load point and a second actuator arm extending from the second load point, wherein each of the first actuator arm and the second actuator arm connected to the moving carriage.

\* \* \* \* \*